United States Patent
Grimaldi et al.

(10) Patent No.: US 10,235,256 B2
(45) Date of Patent: Mar. 19, 2019

(54) SYSTEMS AND METHODS FOR HIGHLY-AVAILABLE FILE STORAGE WITH FAST ONLINE RECOVERY

(71) Applicant: Hitachi Vantara Corporation, Santa Clara, CA (US)

(72) Inventors: Kevin Canuette Grimaldi, Austin, TX (US); Morgan Tyler Maxwell, Ashland, MA (US); Clayton A Curry, Framingham, MA (US)

(73) Assignee: Hitachi Vantara Corporation, Santa Clara, CA (US)

( * ) Notice: Subject to any disclaimer, the term of this patent is extended or adjusted under 35 U.S.C. 154(b) by 98 days.

(21) Appl. No.: 15/122,947

(22) PCT Filed: Aug. 18, 2014

(86) PCT No.: PCT/US2014/051419
§ 371 (c)(1),
(2) Date: Sep. 1, 2016

(87) PCT Pub. No.: WO2016/028253
PCT Pub. Date: Feb. 25, 2016

(65) Prior Publication Data
US 2017/0075779 A1    Mar. 16, 2017

(51) Int. Cl.
*G06F 11/00* (2006.01)
*G06F 11/20* (2006.01)
(Continued)

(52) U.S. Cl.
CPC .......... *G06F 11/2069* (2013.01); *G06F 3/067* (2013.01); *G06F 11/20* (2013.01);
(Continued)

(58) Field of Classification Search
CPC .. G06F 11/2069–11/2087; G06F 3/061; G06F 3/0665; G06F 3/067
See application file for complete search history.

(56) References Cited

U.S. PATENT DOCUMENTS 7,415,488 B1 * 8/2008 Muth .................. G06F 11/2082
707/648
8,676,843 B2    3/2014 Bayliss et al.
(Continued)

OTHER PUBLICATIONS

International Search Report of PCT/US2014/051419 dated Nov. 19, 2014.
(Continued)

*Primary Examiner* — Michael Maskulinski
(74) *Attorney, Agent, or Firm* — Mattingly & Malur, PC

(57) ABSTRACT

The storage system includes storage devices which have plural storage blocks. A first node with a first processor memory is configured to store first information which manages states of the storage blocks, and a second node including a second processor and memory is configured to store second information which manages the states of the storage blocks are included in the storage system to handle file operations. When a failure occurs on the second node, the first processor is configured to change the state of one or more storage blocks, previously reserved by the second node to be used for storing data by the second node, to one or more garbage blocks and perform garbage resolution processing thereon before becoming available for data storage. This process allows for rapid recovery of the filesystem as the entirety of the filesystem metadata need not be examined.

18 Claims, 17 Drawing Sheets

(51) Int. Cl.
*G06F 3/06* (2006.01)
*G06F 13/38* (2006.01)
*G06F 17/30* (2006.01)

(52) U.S. Cl.
CPC .......... *G06F 11/2082* (2013.01); *G06F 13/38* (2013.01); *G06F 17/30168* (2013.01); *G06F 2201/805* (2013.01); *G06F 2201/82* (2013.01)

(56) References Cited

U.S. PATENT DOCUMENTS

| | | | |
|---|---|---|---|
| 9,021,296 B1* | 4/2015 | Kiselev | H03M 13/154 714/6.23 |
| 2004/0117563 A1* | 6/2004 | Wu | G06F 9/52 711/150 |
| 2005/0193245 A1* | 9/2005 | Hayden | G06F 11/2069 714/13 |
| 2007/0260842 A1 | 11/2007 | Faibish et al. | |
| 2008/0046444 A1 | 2/2008 | Fachan et al. | |
| 2010/0199042 A1* | 8/2010 | Bates | G06F 11/2064 711/114 |
| 2014/0122718 A1 | 5/2014 | Thoppai et al. | |
| 2014/0157085 A1 | 6/2014 | Shalvi et al. | |
| 2014/0258608 A1* | 9/2014 | Viswanatha | G06F 12/0873 711/113 |
| 2016/0004598 A1* | 1/2016 | Lillibridge | G06F 17/30159 707/654 |
| 2017/0242755 A1* | 8/2017 | Litke | G06F 3/0622 |
| 2018/0011650 A1* | 1/2018 | Litke | G06F 3/0622 |

OTHER PUBLICATIONS

Extended European Search Report received in corresponding European Application No. 14900157.0 dated Feb. 12, 2018.

* cited by examiner

SYSTEMS AND METHODS FOR HIGHLY-AVAILABLE FILE STORAGE WITH FAST ONLINE RECOVERY

TECHNICAL FIELD

The present invention relates generally to highly-available data storage. Particularly, the present invention relates to block-level file storage with block-level recovery.

BACKGROUND

In conventional storage systems for storing files, the systems are subject to suffering from system crashes which may happen unpredictably over time. When a crash occurs in conventional storage systems, one or more file systems stored thereon will be subject to availability issues where the files stored as data in the file systems may become unavailable and unable to be accessed. Further, during a crash, the systems may be unable to handle write operations for storing new files thereon. The period of time that the system will be unavailable can vary and the unavailability of the system may be prolonged while the state of the data and file system metadata stored on the system is checked for consistency.

The foregoing availability problem is generally inherent in the architecture of conventional storage systems. Namely, the data for files and the metadata about the files are generally stored in a large, fixed data structure which resides on a single, contiguous area of storage media (e.g., a disk or a logical partition). In recovering from a crash, the entirety of the fixed data structure must be checked for consistency before additional reading and writing to the data structure can take place.

In an attempt to mitigate the time period during which the storage system is unavailable for reading and writing, journaling is a conventional technique that may be applied. In journaling, a portion of disk space is allocated to maintain a series of journals which record transactions and act as a buffer of "in-flight" file transactions. In-flight transactions are data writing operations which are considered to be in the process of writing and not yet finalized. After a crash, if the most recent journal is in a serviceable state (e.g., able to be read), any data in the file system not included in the journal is assumed to be consistent. Further, any data included in the journal is checked, or replayed, to ensure that all transactions up to the point where the crash occurred are complete and the data in the file system is consistent before accepting additional reading and writing to the file system. When a crash occurs during an update to a journal, the journal may become unserviceable and all data and metadata in the file system will need to be checked for consistency. The problem of needing to check all file data as well as all metadata for a given file system can require a large period of time and processing resources before the data in the file system becomes available which negatively impacts the ability of the storage system to handle data transactions.

BRIEF SUMMARY OF THE INVENTION

In view of the foregoing problems in conventional storage systems, described above, a storage system is provided with a file system service which is provided over a block storage service and is also provided with a highly-available, transaction-safe relational database to manage data storage. The relational database system is said to be transaction-safe because transactions in the relational database system occur "atomically". Namely, individual transactions in the relational database system either successfully complete or completely fail; no partial state change is allowed. In various embodiments of the present invention, a storage system has a file system service which is logically provided over a block storage service and is also logically provided with a highly-available, transaction-safe relational database to manage data storage in block units and which stores all file system metadata. Here, blocks are storage areas of predetermined size which are allocated for use by the storage system and the storage areas correspond to areas of physical storage devices.

Further, in an exemplary embodiment of the present invention, a storage system includes a plurality of storage devices which have a plurality of storage blocks. A first node including a first processor and a first memory are configured to store first information which manages states of the plurality of storage blocks, and a second node including a second processor and a second memory being configured to store second information which manages the states of the plurality of storage blocks are included in the storage system. When a failure occurs on the second node, the first processor is configured to transition the state of one or more storage blocks, which are reserved by the second node and on which a write procedure of file data is not completed, as one or more garbage blocks. Each of the nodes is provided to handle data transactions from one or more clients or applications.

In an additional example, a failure occurs on both the first and second nodes, one of the nodes will regain operational abilities first. In such a case, the first node to recover is configured to transition the state of one or more storage blocks, which are reserved by either of the nodes and on which a write procedure of file data is not completed, as one or more garbage blocks. After changing the state of the reserved blocks to garbage blocks, the first recovered node resumes handling data transaction from one or more clients or applications. When the second node recovers, the second node also resumes handling data transaction from one or more clients or applications. The garbage blocks are eventually returned to the free state as a part of garbage resolution.

In yet another additional example, a failure occurs on both the first and second nodes, and one of the nodes will regain operational abilities first. In such a case, the first node to recover is configured to transition the state of one or more storage blocks, which are reserved by the first node and on which a write procedure of file data is not completed, as one or more garbage blocks. Similarly, the second node to recover is configured to transition the state of one or more storage blocks, which are reserved by the second node and on which a write procedure of file data is not completed, as one or more garbage blocks. After changing the state of the storage blocks to garbage blocks, the first and second recovered nodes separately resume handling data transaction from one or more clients or applications. The garbage blocks are eventually returned to the free state as a part of garbage resolution.

The information to manage the states of the plurality of storage blocks is stored in each of the respective first and second nodes as a relational database. In addition, several of the storage devices are separately provided to store the information to manage the states of the plurality of storage blocks and these storage devices are accessible to each of the first and second nodes. The information to manage the states of the storage blocks includes a free table which lists free blocks which are available to be reserved by the nodes, a reserved table which lists reserved blocks which have been reserved by individual nodes, a file table which lists blocks to which file data has been stored as well as the corresponding metadata of the file data, and a garbage table that lists blocks which store data to be processed for return to the free list. The information in the garbage table includes the information from the file table according to delete or overwriting operations, and also includes information from the reserved table after one or more of the nodes has recovered from a crash.

When a crash occurs on one or more of the nodes, blocks reserved by the crashed nodes are moved to the garbage table. The blocks listed in the garbage table are then subject to garbage resolution processing from a garbage resolution service. For blocks that were moved to the garbage table during a file delete or overwrite operation, each of the blocks is moved in an atomic transaction to the free table. Thus, these blocks will again be made available for reservation by the nodes. For blocks that were moved to the garbage table following crash recovery, each block that is also listed in the file table is removed from the garbage table. Meanwhile, each block that is not listed in the file table is indicative of an incomplete write of the corresponding file data and is moved in an atomic transaction to the free table. Thus, the blocks moved to the free table will again be made available for reservation by the nodes.

Accordingly, the foregoing configuration allows for the storage system to recover quickly after an availability event such as a node crashing. That is, the data which must be checked for consistency is restricted to the block information in the garbage table which in most cases will be appreciably smaller than the entire file system. In addition, while the garbage resolution processing is occurring after a crash, read and write requests to blocks can be accepted and handled. The foregoing features and advantages lend themselves to the highly-available and quick-recovery characteristics of the present invention.

DETAILED DESCRIPTION OF THE INVENTION

Figure 1:
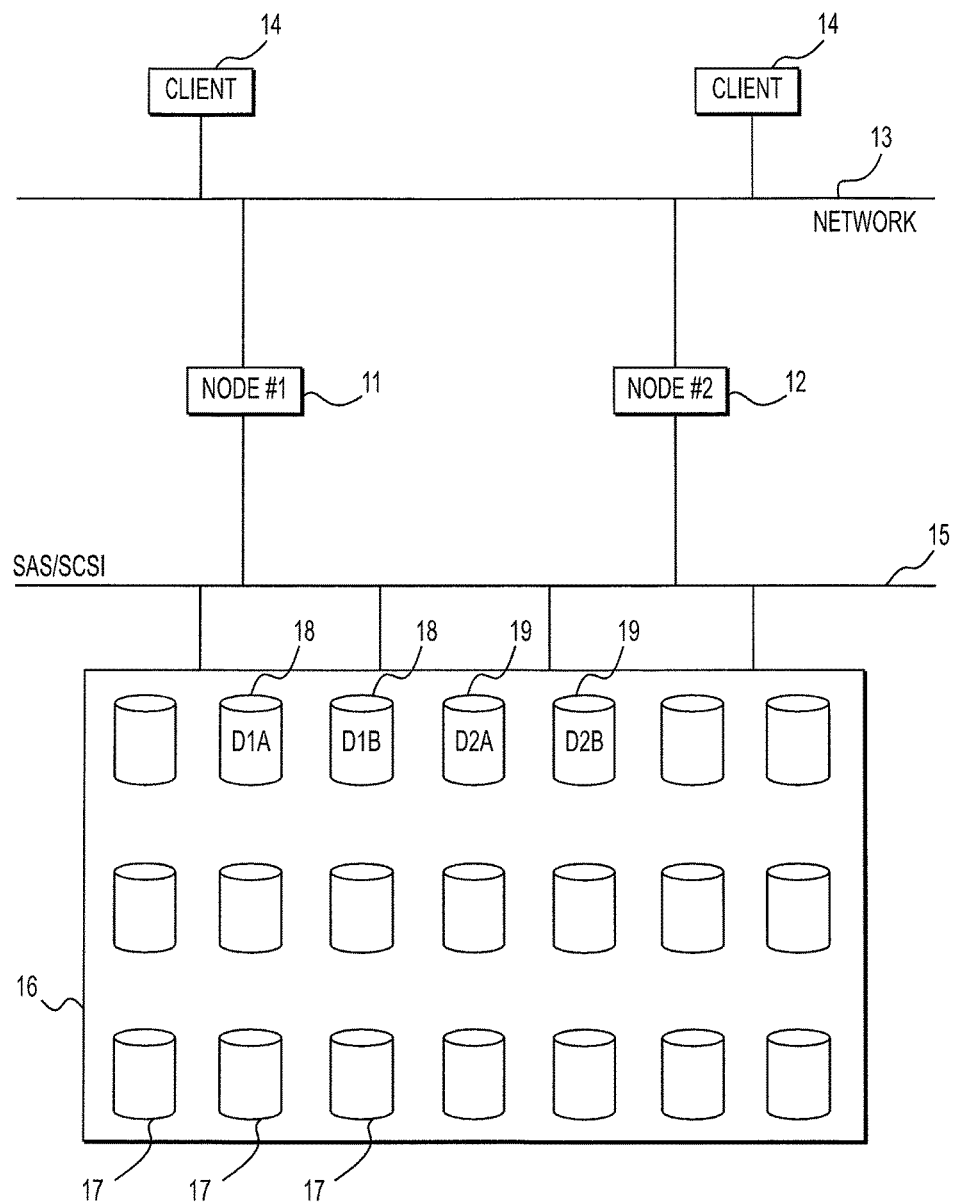
FIG. 1 is a schematic diagram of an illustrative environment for implementing the methods and systems that enable highly-available and quickly-recoverable storage of files.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference are made herein to particular features, structures, and/or characteristics which are described in connection with at least one embodiment of the invention, and the appearances of these phrases in various places in the specification may not necessarily all refer to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Moreover, some portions of the detailed description that follow are presented in terms of flow diagrams of processing flows and symbolic representations of operations within a computer. These flow diagrams of processes, algorithmic descriptions and symbolic representations are the means used by those skilled in the data processing arts to most effectively convey the essence of their innovations to others skilled in the art. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is understood that throughout the description, discussions utilizing terms such as "processing", "determining", "checking", "determining", "moving", "calling" or the like, can include the actions and processes of a computer system or other information processing device that manipulates and transforms data represented as physical quantities (electronic quantities within the computer system's registers and memories) into other data similarly represented as physical quantities within the computer system's memories or registers or other information storage, transmission or display devices.

The present invention also relates to apparatuses or systems for performing the operations herein. These may be specially constructed for the required purposes, or it may include one or more general-purpose computers or Servers selectively activated or reconfigured by one or more computer readable media. Such computer-readable storage media have computer executable instructions such as modules stored thereon and generally include, but are not limited to, optical disks, magnetic disks, read-only memories, random access memories, solid state devices and drives, or any other type of media suitable for storing electronic information. The processes, algorithms and displays presented herein are not inherently related to any particular computer or other apparatus. Various general-purpose systems may be used in accordance with the teachings herein, or it may prove convenient to construct a more specialized apparatus to perform desired processes and methods. The structure for a variety of these systems will appear from the description set forth below. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers. While the following description refers to file systems, such as NFS as a baseline network filesystem, which provides filesystem services over a network to store and retrieve data or files from a storage device, the scope of the present invention is not limited in this regard. Exemplary embodiments of the invention, as will be described in greater detail below, provide apparatuses, systems, methods and computer modules for storing data and the management thereof to provide highly-available storage with online recovery.

FIG. 1 is a schematic diagram of an illustrative environment for implementing the methods and systems that enable highly-available and quickly-recoverable storage of files. In FIG. 1, one or more clients 14 (e.g., client computers) are connected to communicate with a pair of nodes (i.e., Node #1 and Node #2) 11, 12 as storage apparatuses or systems which store file data for the clients. For example, a network 13 is provided for the communication between the nodes 11, 12 and the clients 14. Further, the nodes 11, 12 are connected to a shared storage pool 16 which contains a plurality of storage devices 17. As shown in FIG. 1, the nodes 11, 12 are connected to the shared storage pool 16 via a SAS/SCSI bus 15. However, the nodes 11, 12 may be connected to storage devices 17 via other types of architectures as long as multiple access (e.g., dual access) is supported. Each of the storage devices 17 are accessible by each of the nodes 11, 12.

In FIG. 1, the system includes two nodes 11, 12, but the number of nodes is not limited to this configuration. It means the system can include a plurality of nodes (two or more nodes).

Within the storage pool 16, from among the storage devices 17, two storage devices 18 are provided to separately store an entire relational database of the first node 11 while two storage devices 19 are provided to separately store an entire relational database of the second node 12. The storage devices 18 are configured as a RAID 1 pair (i.e., D1A and D1B) which are mirrored to provide redundancy against the failure of one of the storage devices 18. Likewise, the storage devices 19 are configured as a RAID 1 pair (i.e., D2A and D2B) which are mirrored to provide redundancy against the failure of one of the storage devices 19. Further, other than the storage devices 18, 19, the storage devices 17 are configured to store file data from the clients 14 and are directly managed by the block management service on each node.

Figure 2:
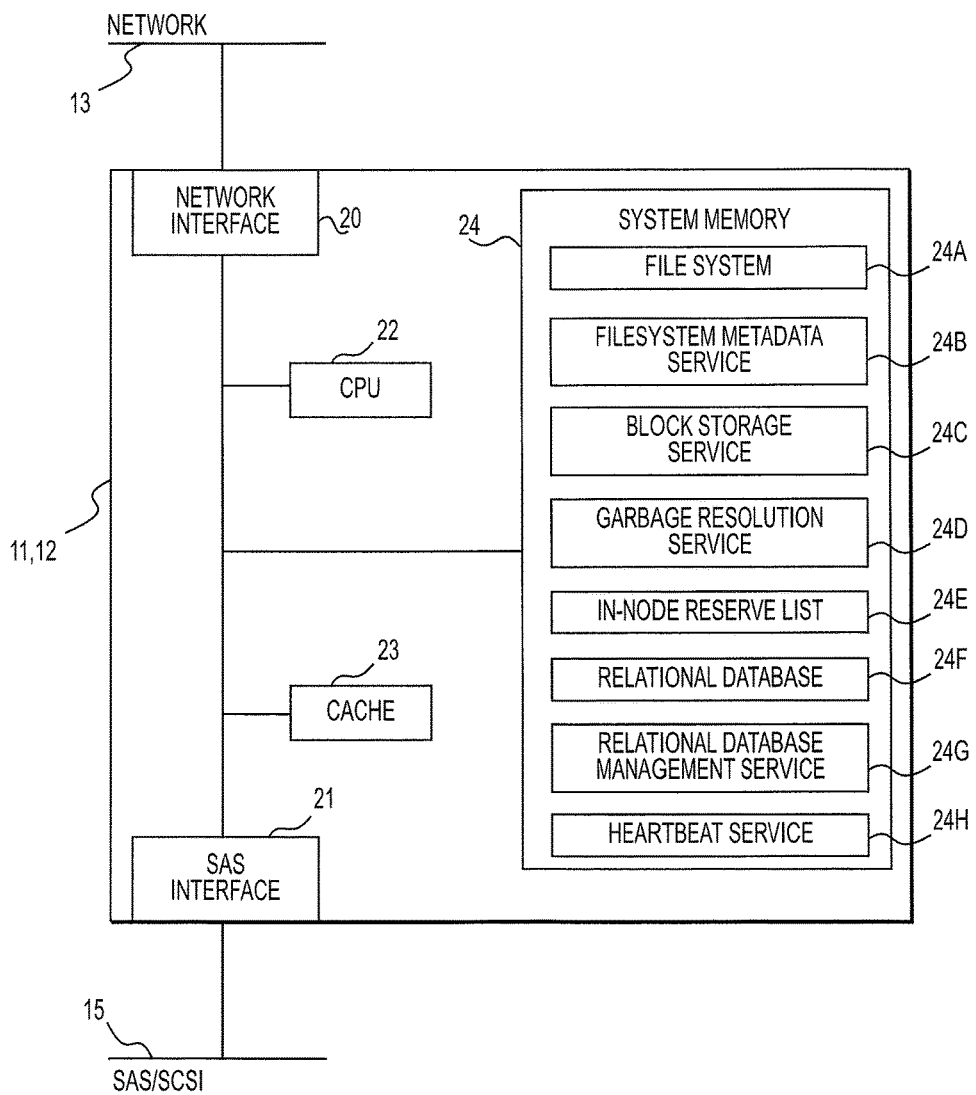
FIG. 2 is a block diagram of a hardware and software configuration of one of the nodes shown in the schematic diagram of FIG. 1.

FIG. 2 is a block diagram of a hardware and software configuration of one of the nodes shown in the schematic diagram of FIG. 1. Each of the nodes 11, 12 are configured identically. As shown in FIG. 2, the node 11 is connected to the network 13 via a network interface 20 and is connected to the storage pool via an SAS interface 21. It should be noted that other protocols may be implemented at the interface 21. Further, the node 11 is provided with a central processing unit (CPU) 22 which includes one or more processors, a system memory 24 and a cache 23 which may be volatile or non-volatile memory as hardware components which are interconnected. Further, the system memory 24 stores at least a portion of a filesystem 24A, a file system metadata service 24B, a block storage service 24C, a garbage resolution service 24D, an in-node reserve list 24E, a relational database 24F, a relational database service 24G, and a heartbeat service 24H. Each of the services in the system memory 24 may be provided by one or more software programs executed by the CPU 22.

The nodes may include more than one filesystem 24A and each filesystem 24A is accessible by the clients 14 from either of the nodes 11, 12 as a distributed filesystem. The filesystem metadata service 24B manages the metadata of each file stored in the file system 24A. All of the file metadata for file data stored in the file systems 24A are managed by the file system metadata service 24B. Example metadata information includes user information, pathname information, access control information, and file hash information. The block storage service 24C allocates blocks for data storage which correspond to storage areas of the storage devices 17. The blocks are each of a predetermined length and are for example 4 KB but may be other predetermined sizes as well. The garbage resolution service 24D provides the processing flow shown in FIG. 10. The in-node reserve list 24E is a table of data blocks currently reserved by the respective node. The in-node reserve list 24E may be stored in the system memory 24 as shown in FIG. 2, or may alternatively be located in the cache 23 of each node 11, 12. The data in the in-node reserve list 24E corresponds to the most current list of reserved blocks for the respective node. Accordingly, the in-node reserve list 24E needs to periodically synchronize with the relational database information stored in the storage devices 18, 19 for each node 11, 12.

Figure 4:
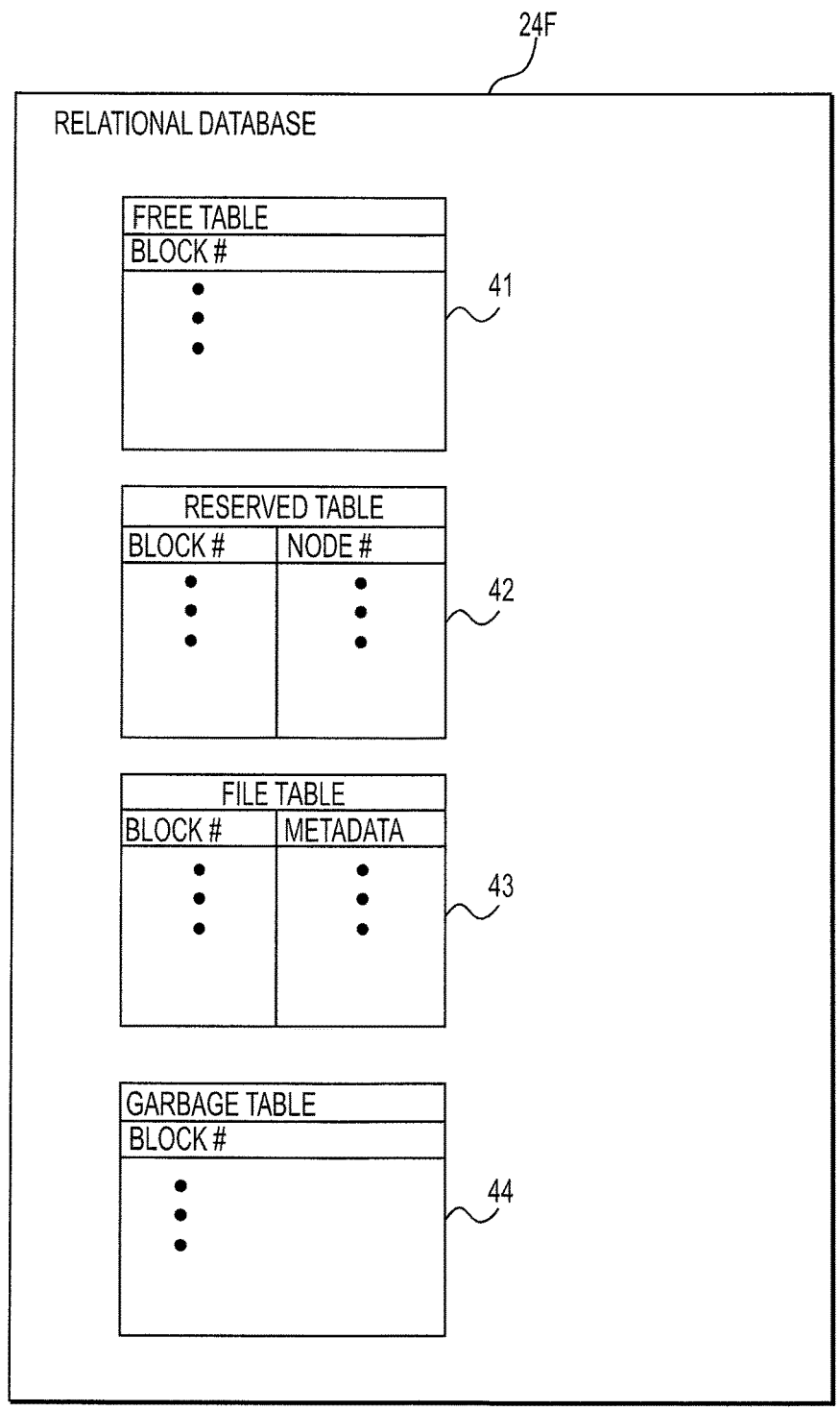
FIG. 4 shows an exemplary relational database which stores information to manage states of a plurality of storage blocks.

Further, in FIG. 2, each node 11, 12 also maintains an in-node relational database 24F. The details of the relational database 24F are shown in FIG. 4 which will be described later. Each node also has a relational database management service 24G which handles the management of the copies of the relational database information stored in the system memory 24, the storage devices 18,10 and the synchronization thereof. Additionally, a heartbeat service 24H operates on each node 11, 12. The heartbeat service 24H handles periodic notifications between nodes 11, 12 so that each node 11, 12 can detect when the other of the nodes has crashed using a so-called "heartbeat". As one of skill in the art will appreciate there are many techniques known in the art which are suitable for determining when a respective node has crashed by the other of the nodes. The heartbeat service 24H may not only detect crashes but may also proactively provide a notification that the respective node has performed a clean shutdown. An area of the system memory 24 may be designated to store a clean shutdown flag, not shown in FIG. 2, to indicate that the node has shutdown cleanly and that there is no crash recovery necessary. Preferably, an area in the storage devices 17, 18, 19 would store the clean shutdown flag so that an operational node can determine that the other, shutdown node did not crash but rather has shutdown.

For example, if Node #1 were to shutdown cleanly, a clean shutdown flag would indicate to Node #2 that Node #1 has performed a clean shutdown and not crashed. Moreover, the clean shutdown flag set by Node #1 before shutting down would further indicate to Node #1, upon coming back online, that Node #1 did not crash but rather cleanly shutdown and vice versa for Node #2. If the clean shutdown flag is set for a node, upon node recovery, those node's reserved blocks are not moved to garbage.

Figure 3:
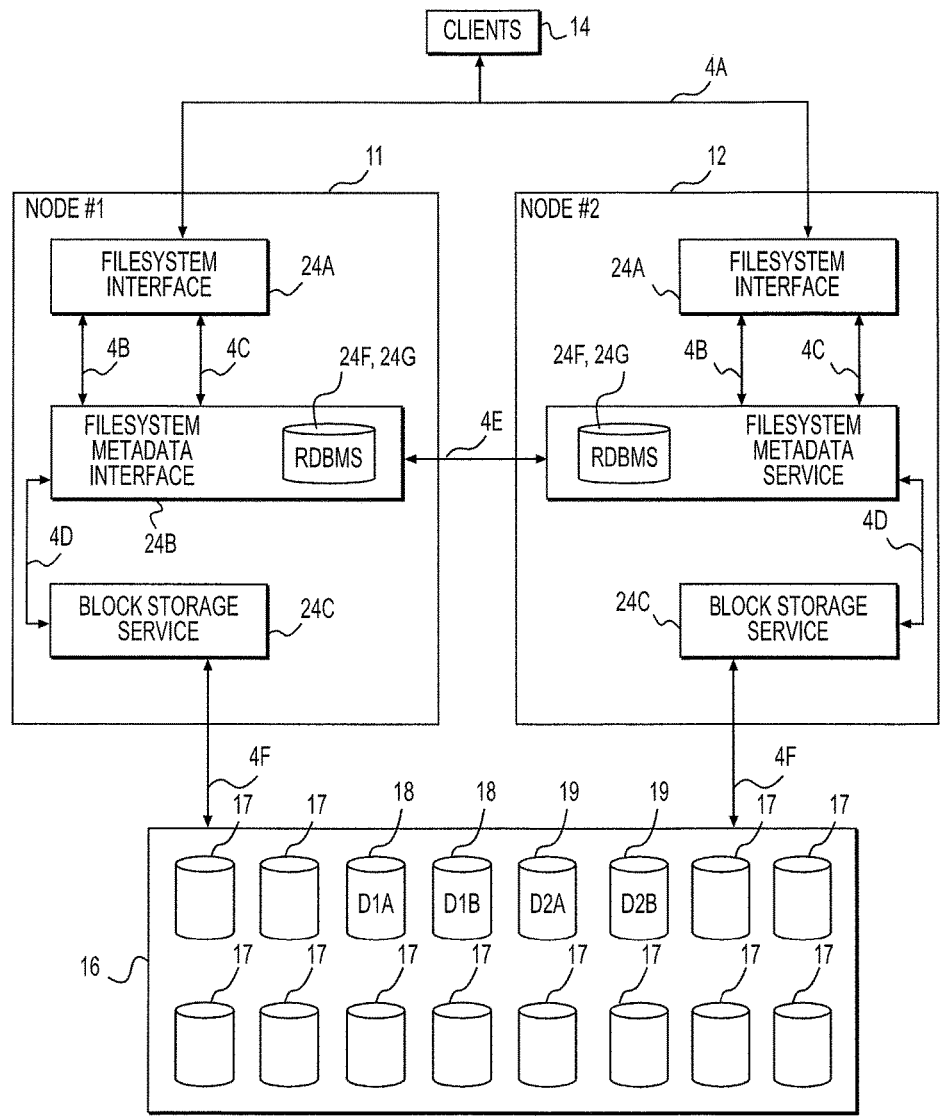
FIG. 3 is a logical diagram of the illustrative environment for implementing the methods and systems that enable highly-available and quickly-recoverable storage of files shown in FIG. 1 and includes data transactions between various components.

FIG. 3 is a logical diagram of the illustrative environment for implementing the methods and systems that enable highly-available and quickly-recoverable storage of files shown in FIG. 1 and includes the data transactions between various components via data paths 4A to 4E. The clients 14 direct file operation requests 4A to the nodes 11, 12. The file operation requests 4A specify whole files stored in the storage pool 16 and are received by the nodes 11, 12 at a respective filesystem interface 24A. Each filesystem 24A communicates with the filesystem metadata service 24B. The data transactions between the filesystem 24A and the filesystem metadata service 24B include block allocation data 4B and file metadata 4C transactions. Each filesystem metadata service 24B manages the relational database 24F instance which is respectively in-node as well as the relational database management service 24G. As shown in FIG. 3, the relational databases 24F may be synchronously replicated via data path 4E between the nodes 11, 12.

Accordingly, the nodes 11, 12 store same relational database information in their respective system memories 24. The synchronization of the relational databases 24F on the nodes 11, 12 may occur directly between nodes 11, 12 as shown in FIG. 3 via the replication data path 4E. Preferably, the in-node relational databases 24F will also be synchronized with the respective relational databases D1A, D1B, D2A and D2B stored in the storage pool 16 on the storage devices 18, 19. By maintaining synchronization with the relational databases D1A, D1B, D2A and D2B stored in the storage pool, each node 11, 12 can access the relational database of the other node even if the other node has crashed or shutdown. As one of skill in the art can appreciate, the RAID mirroring between D1A and D1B as well as D2A and D2B provides redundancy for the relational database information, further protecting against storage device failure in the storage pool 16.

Each of the filesystem metadata services 24B further communicates with the block storage service 24C to perform file content data and metadata backups 4D. The block storage service 24C in turn communicates file content data to be stored in the storage pool 16 via SAS/SCSI transactions 4F. Further, the block storage service 24C is configured to provide fixed-length storage areas referred to herein as "blocks". Each block represents a storage area to store file data in the shared storage pool 16 and may be, for example, 4 KB in size. The block storage service 24C allocates one or more blocks to the filesystem metadata service 24B as needed as will be explained later. Accordingly, clients 14 are able to perform file-level transactions on data stored at the block-level in the storage pool 16 via either of the nodes 11, 12.

FIG. 4 shows an exemplary relational database which stores information to manage states of a plurality of storage blocks. As shown in FIG. 3, each of the nodes 11, 12 manages an instance of the relational database 24F as in-node information. Further, each node 11, 12 synchronizes the respective relational database 24F with the respective mirrored-pair 18,19 in the storage pool 16 so that each node 11, 12 can access the relational database information of the other respective node.

As shown in FIG. 4, the relational database information includes a free table 41, a reserved table 42, a file table 43, and a garbage table 44. The free table 41 includes a list of blocks which are identified by block number and have been allocated from the block storage service 24C. Blocks listed in the free table 41 indicate that the blocks are not currently allocated to any file and are not currently involved in write processing. Blocks which are listed in the free table by the file system metadata service 24B/relational database management service 24G are blocks which have been allocated by the block storage service 24C. Accordingly, the block storage in the present invention can be implemented in the storage pool 16 using thin-provisioning techniques.

Figure 13:
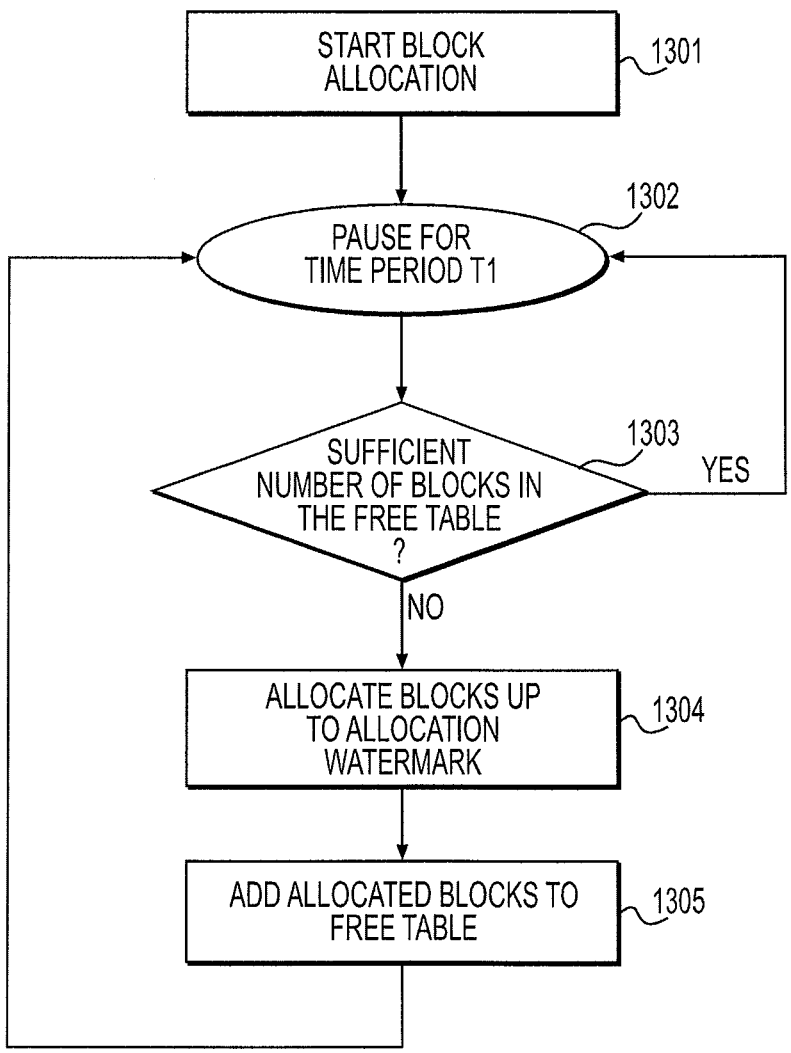
FIG. 13 is a block allocation processing flow for allocating blocks.

The free table 41 is monitored by the file system metadata service 24B/relational database management service 24G. The file system metadata service 24B/relational database management service 24G may communicate with the block storage service 24C to manage the allocation of blocks to be used for storing file data. FIG. 13 shows an exemplary block allocation processing flow. At step 1301, block allocation is started for example as a thread in the system memory by the block storage service 24C. After waiting or pausing for a configurable time period T1 at step 1302, when the number of blocks listed in the free table 41 becomes insufficient or falls below a predefined lower threshold, at step 1303, the file system metadata service 24B/relational database management service 24G will request that additional blocks be allocated to the file system metadata service 24B/relational database management service 24G so that a shortage of block availability can be prevented. Namely, the number of additional blocks requested is limited so that the total number of blocks listed in the free table 41 does not exceed an allocation watermark, as an upper threshold, at any one time as shown at step 1304. The predefined lower and upper thresholds may be configurable so as to be adjustable on the fly. At step 1305, the file system metadata service 24B/relational database management service 24G adds the allocated blocks to the free table 41. Otherwise, at step 1303, if the number of blocks in the free table is sufficient, the block storage service 24C will again pause for time period T1 at step 1302 before repeating the foregoing as shown in FIG. 13.

The reserved table 42 includes a list of blocks identified by block number which have been reserved for use in servicing client writes from the free table by the nodes 11, 12. Each block is capable of being reserved by either node from the free table 41, and the reserved table 42 indicates which node (i.e., Node #1 or Node #2) reserves each individual block in the reserved table. Thus, each node can separately determine which blocks are reserved by which node by referring to the reserved table 24 stored in the in-node relational database 24F. Each block listed in the reserved table 42 includes one or more blocks that have been reserved by one of the nodes 11, 12. Further, one or more blocks listed in the reserved table 42 may be participating in the writing of file data. As such, the reserved table 42 includes information for the node which has reserved each respective block.

The provisioning of blocks to the reserved table 42 is described below with reference to FIG. 14. In general, a write request will cause a respective node to mark a set of blocks in the reserved table as being written to, and then those blocks are recorded in the file table 43 when the write is complete. A write request will cause blocks to be moved from the free table 41 to the reserved table 42 when there is not a sufficient amount of blocks in the reserved table 42 to service the current write request.

Figure 14:
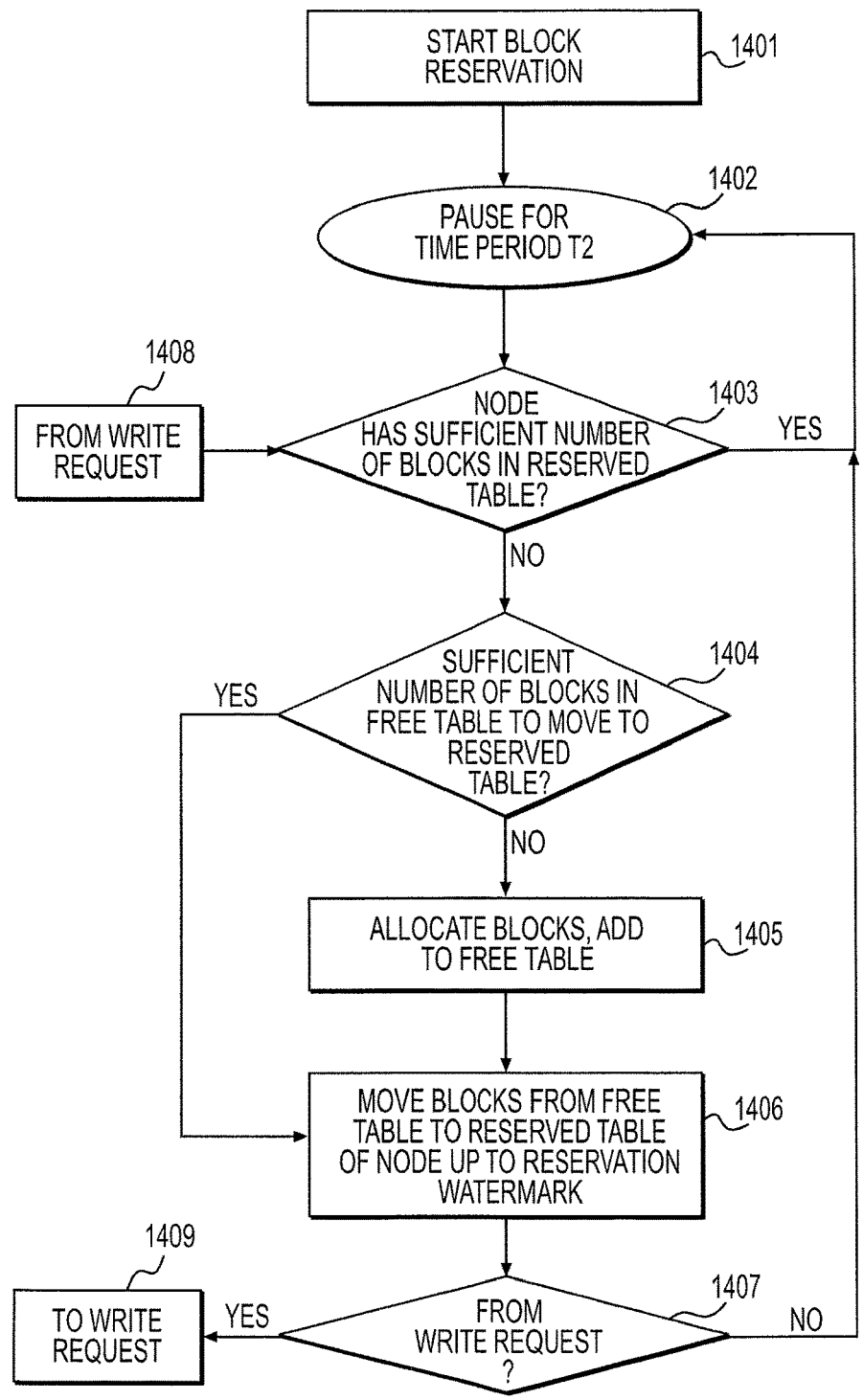
FIG. 14 is a block reservation processing flow for reserving blocks.

As shown in FIG. 14, a block reservation process is started, for example, as a thread in the system memory by the block storage service 24C at step 1401. After waiting or pausing for a time period T2, which is configurable, at step 1402, it is determined whether the respective node has a sufficient number of blocks in the reserved table 42 at step 1403. If an insufficient number of blocks are present (the number of blocks listed in the reserved table 42 is lower than a predefined lower threshold, it is then determined at step 1404 whether a sufficient number of blocks are available in the free table 41 to be moved to the reserved table 42. If not, at step 1405, a sufficient number of blocks will be allocated and placed in the free table according to the block allocation processing shown in FIG. 13, for example. Otherwise, processing moves from step 1404 to step 1406 where plural blocks are moved from the free table 41 to the reserved table 42 so that the number of blocks in the reserved table 42 does not exceed a reservation watermark, as an upper threshold, for the reserved table 42. As shown in FIG. 14, block reservation may be triggered in response to a write request at step 1408. Accordingly, at step 1407, it is determined after the reserved list 42 is filled with blocks at step 1406, whether processing should return to handle a pending write request at step 1409 or to pause for time period T2. As explained above, the reserved table 42 is populated with plural blocks, which may be reserved by the nodes in expectation of receiving future writes from the clients 14.

Further, when copying an existing file, blocks used for the copying operation will also be listed in the reserved table 42. Similar to when a new file is created, to copy file data, one or more blocks will be moved from the free table 41 to the reserved table 42 to accommodate the file data being copied. In accordance with the atomic transactional nature of the present invention, the blocks listed in the reserved table 42 will remain listed therein while, in the case of writing file data, all file content is received from the respective client 14 and stored in the reserved blocks in the storage pool 16. Likewise, in the case of copying file data, the blocks reserved for the copied file data will remain listed in the reserved table 42 until all file data is copied to the reserved blocks in the storage pool 16. This reflects the fact that file operations are atomic transactions that either are completed in full or fail. However, in an alternative modification, when copying an existing file, no additional blocks may be reserved or written to. Instead, the metadata stored in the file table 43 may be updated to reflect the copying of the existing file.

The file table 43 includes a list of blocks identified by block number and all corresponding file metadata which identifies a file stored in the storage pool 16. Specifically, the metadata corresponding to a particular block number in the file table 43 identifies the portion of a file which is stored by the block in the shared storage pool 16. Blocks listed in the reserved table 42 are deleted from the reserved table and re-listed in the file table 43 once one or more blocks storing file data for a respective file have all been written to store the file data. Once blocks are listed in the file table 43, the blocks are considered stable and impervious to crashes occurring on the nodes 11, 12. In other words, if a crash occurs on one or more of the nodes 11, 12, the listing of the blocks in the file table 43 will not be affected or modified by the crash. While a crash at either of the nodes 11, 12 will cause the in-node relational database 24F to be unavailable to the other node, if operational, the file table 43 in the relational database information stored in the disks 18, 19 will be unaffected by the crash. Namely, the existing file data in the blocks of the storage pool 16 will not be affected by a crash of the nodes and the state of the file table 43 in the disks 18, 19 will not be affected. Further, when a client 14 directs a delete request to the nodes 11, 12, the blocks which store the corresponding file data will be removed from the file table 43. Otherwise, once files are written to the storage pool 16 the corresponding blocks will remain in the file table 43 along with all corresponding metadata.

The garbage table 44 includes a list of blocks which are subject to recycling by the garbage resolution service 24D as will be explained with reference to FIGS. 8-10. Each block in the garbage table 44 will be listed due to a file deletion, file overwrite operation or due to one or more of the nodes crashing. When a file is deleted, the blocks storing the file data are moved to the garbage table 44. Similarly, when a file is overwritten, blocks storing the outdated file data are moved to the garbage table 44. However, when a node crashes or fails as will be explained in greater detail below, all blocks listed in the reserved table 42 corresponding to the crashed node will be moved to the garbage table 44. Each block in the garbage table 44 will be processed by the garbage resolution service 24D.

Figure 8:
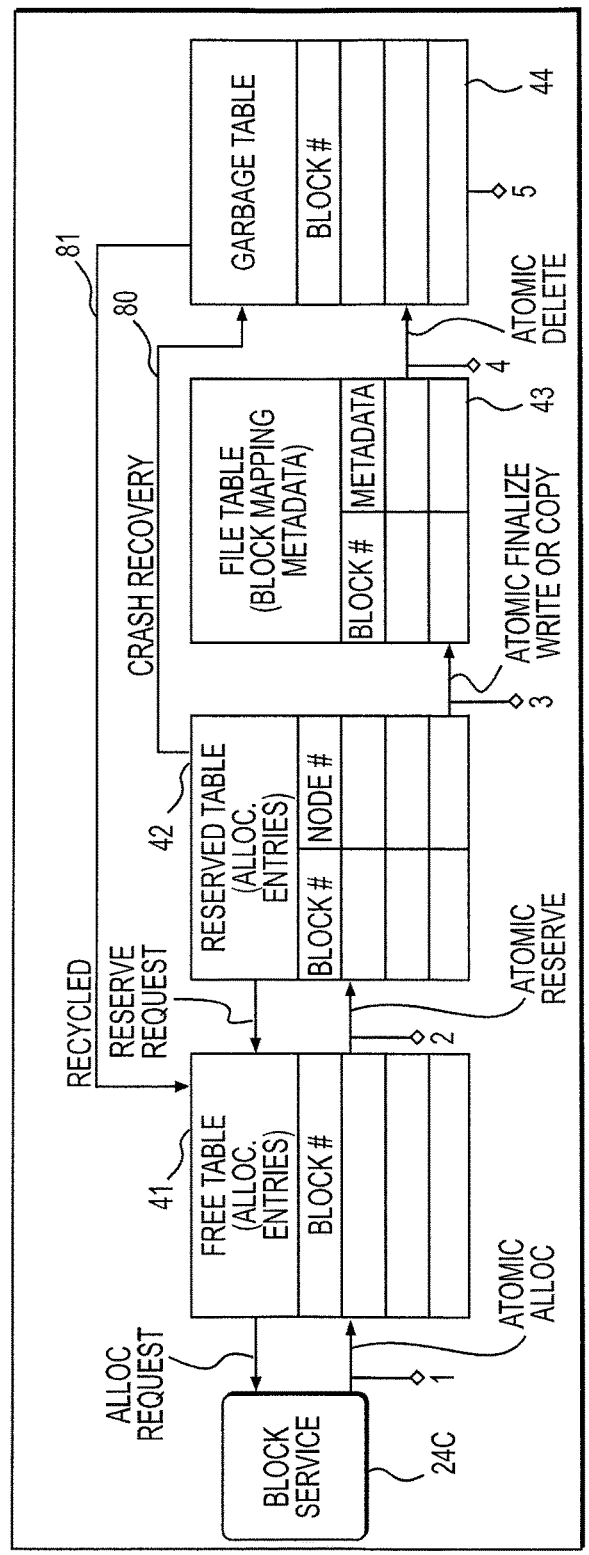
FIG. 8 is an overview of block allocation, write processing, read processing, crash recovery processing and garbage resolution processing with respect to the relational database shown in FIG. 4.
Figure 9A:
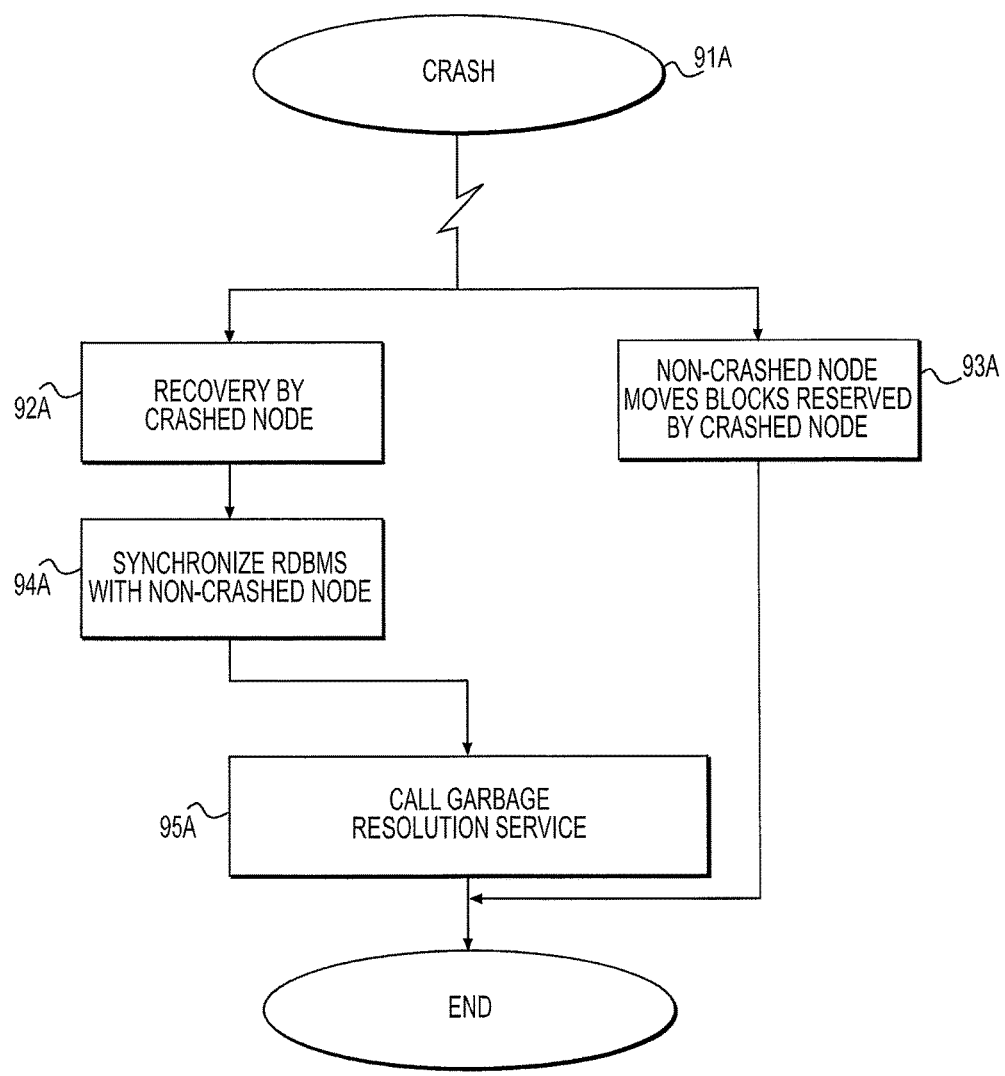
FIG. 9A is a crash recovery processing flow for recovering from a crash at one node.

FIG. 8 shows an exemplary flow of information between the block storage service 24C and the relational database information in the relational databases 24F stored in the Node #1, the Node #2, and the storage pool on storage devices 18, 19. The block storage service 24C receives a request for the allocation of a plurality of blocks from the filesystem metadata service 24G, and returns a list of blocks which are stored in the free table 41 as an atomic transaction at an arbitrary time point 1. One or more of the nodes may crash during the allocation of blocks. Should a crash occur at time point 1, the allocation will fail due to the atomic nature of recording the block allocation. After recovering from crashing and at any other time, if the reservation of blocks and movement into the reserved table 42 cannot complete because the free table 41 has an insufficient number of blocks, the reservation waits for the block allocation procedure, as in FIG. 13, to provide additional free blocks so that the reservation of the required number of blocks can complete.

Blocks from the free table 41 are available to be reserved by each of the nodes 11, 12, and upon being reserved, are listed in the reserved table 42 as an atomic transaction at an arbitrary time point 2. Should a crash occur at time point 2 while reserving blocks for file creation, the connection between the client 14 and the crashed node 11, 12 will fail and due to the atomic nature of the block reservation, blocks will remain in the free table 41 with no blocks being reserved for file creation. As such, a crash at time point 2 will require the client 14 to retry the file creation operation (e.g., file writing or copying).

After a file write request, or alternatively a file copy request, is completely received at a node, and writing of the corresponding file data to one or more blocks has finalized, the one or more blocks are removed from the reserved table 42 and listed in the file table 43 in correspondence with all the associated metadata of the file. The movement of blocks from the reserved table 42 in the relational database 24F occurs during write or copy operations as an atomic transaction at an arbitrary time point 3. Only after all of the contents of a given file have been received at one of the nodes 11, 12 and stored in the storage pool 16, will the file table 43 be atomically updated to list the blocks which store the file data and all of the metadata thereof, and the listing of the blocks will be removed asynchronously from the reserved table 42.

When a crash occurs at time point 3, blocks, which are reserved by crashed node, will be moved from the reserved table 42 to the garbage table 44 during crash recovery 80. When a crash occurs at time point 3 at only one of the two nodes 11, 12, the nodes will jointly perform the crash recovery processing shown in FIG. 9A. Namely, the node that remains operational will move 80 the blocks in the reserved table 42 that are associated with the crashed node to the garbage table 44 by listing the blocks in the garbage table 44 and removing them from the reserved table 42.

For instance, a crashed node may reboot automatically or it may need to be replaced because of hardware failure. In either case, the crashed node eventually recovers from the crash, and obtains information of the relational database from the non-crashed to synchronize its own relational data base with the relational database stored in the non-crashed node, and then the overall system returns to dual-node operation. Alternatively, the recovered node obtains information of the relational database from the storage pool, instead of the non-crashed node, to synchronize its own relational database with the relational database stored in the non-crashed node.

Figure 9B:
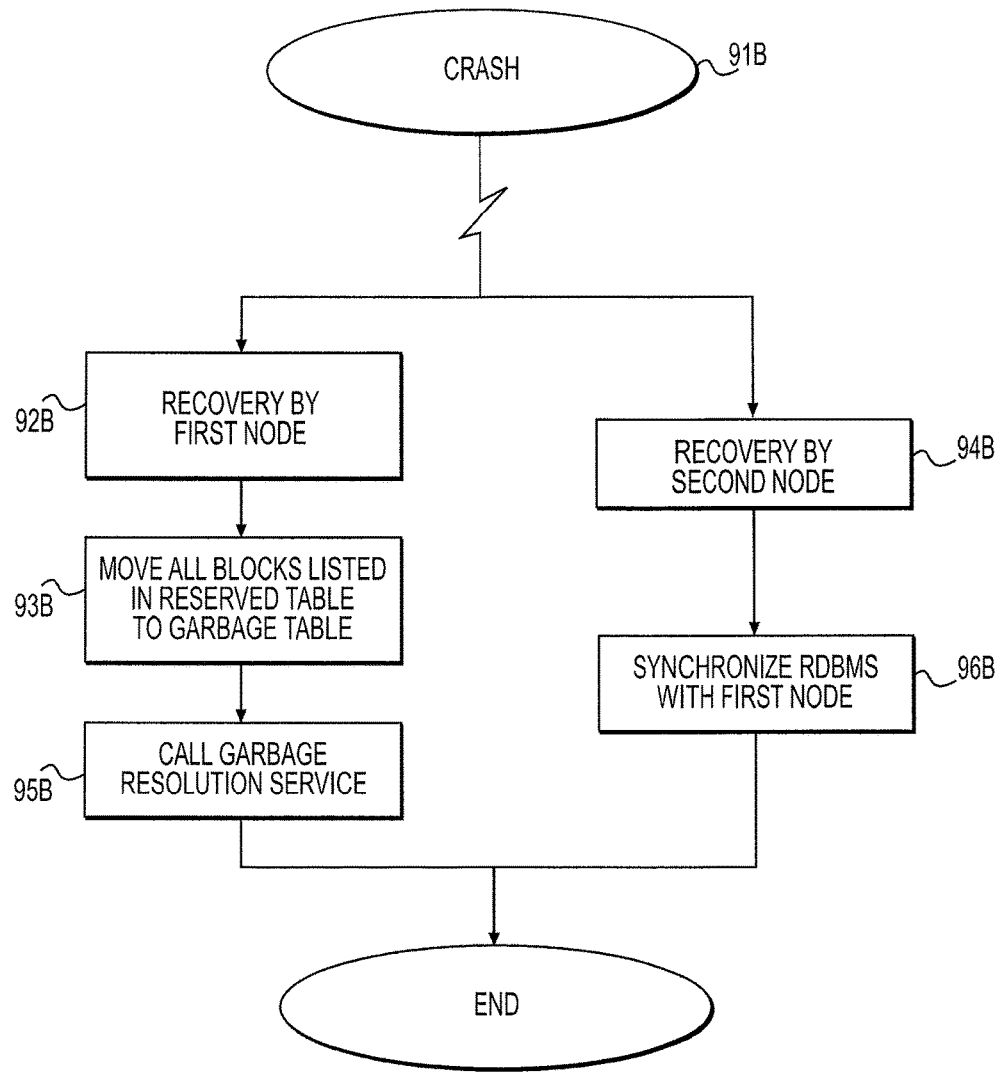
FIG. 9B is a crash recovery processing flow for recovering from a crash at both nodes.
Figure 10:
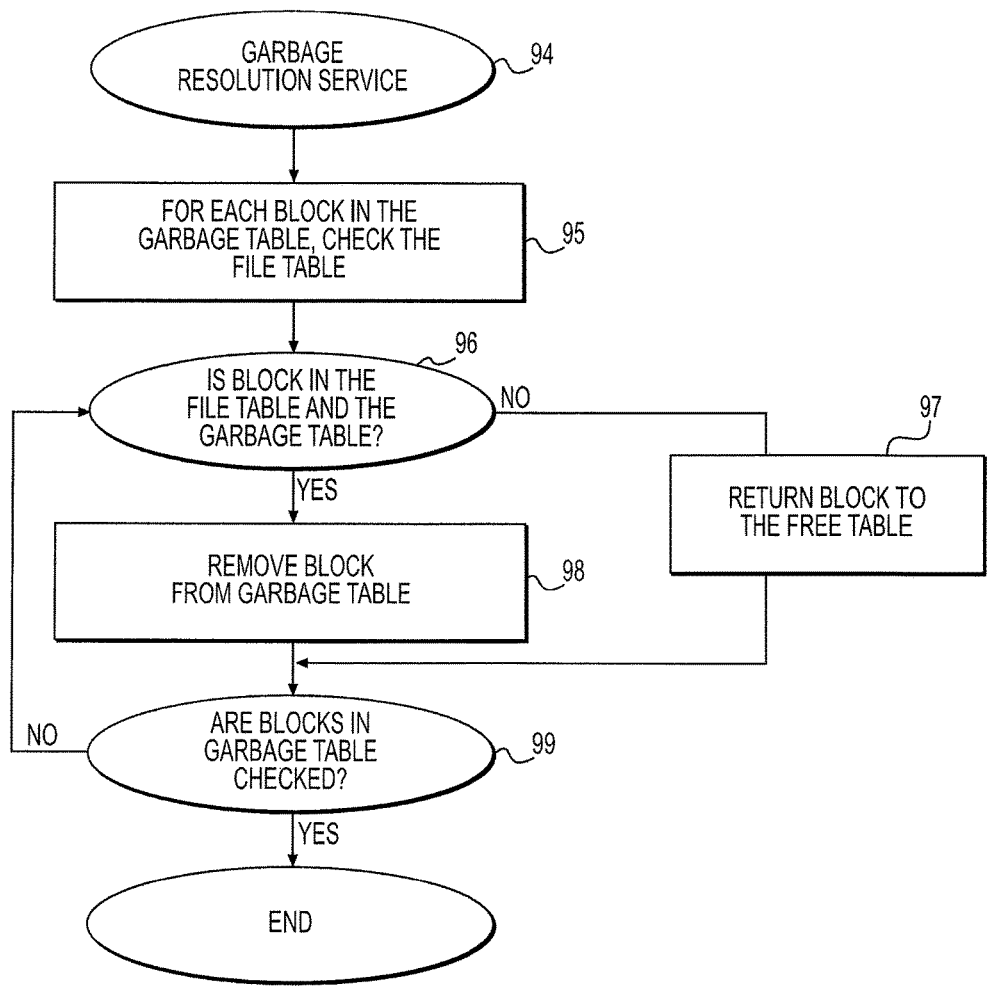
FIG. 10 is a garbage resolution processing flow for determining the state of blocks listed in the relational database of FIG. 4.

When a crash occurs at time point 3 at both of the nodes 11, 12, the two nodes 11, 12 will jointly perform the crash recovery processing shown in FIG. 9B. In particular, all blocks reserved by Node #1 and all blocks reserved by Node #2 will be moved to the garbage table 44 by the first of the nodes to become operational after both nodes crash.

When crashes occur at the nodes 11, 12 between time points 2 and 3, the connection between the client 14 and the crashed node 11, 12 will fail and due to the atomic nature of storing the file data, blocks will remain in the reserved table 42 without being added to the file table 43. As such, a crash at either node between time point 2 and time point 3 will require the client 14 to retry the file creation operation (e.g., file writing or copying).

Further, as shown in FIG. 8, when file data is deleted, blocks listed in the file table 43 are moved to the garbage table 44 in an atomic transaction at an arbitrary time point 4. Should a crash occur at time point 4 while a delete request is pending, the deletion of file data will atomically fail and the blocks associated with the data to be deleted will remain in the file table 43. As such, the client will need to retry the deletion at the remaining operational node or wait for the crashed node to recover until the deletion atomically completes. If a node 11, 12 crashes just after time point 4, the deletion of the file data may be successful but the client may not receive acknowledgement of the completion of the delete request. In this case, the client will need to retry requesting the deletion to ensure that the file data is deleted.

In addition, at an arbitrary time point 5, the garbage resolution service 24D will recycle 81 blocks listed in the garbage table 44 and the blocks will be returned to the free table 41 so that the blocks are made available for writing or copying file data again. In particular, the garbage resolution service 24D will process each block listed in the garbage table 44 as a separate atomic operation. If a crash occurs at time point 5 on either of the nodes 11, 12, the node which has crashed will resume operation at the point immediately after the most recent atomic operation. While FIG. 8 shows a general overview and abstract flow of information within the relational database 24F, FIGS. 5-7 and 9-10 show the processing performed by the nodes 11, 12 in greater detail.

Figure 5:
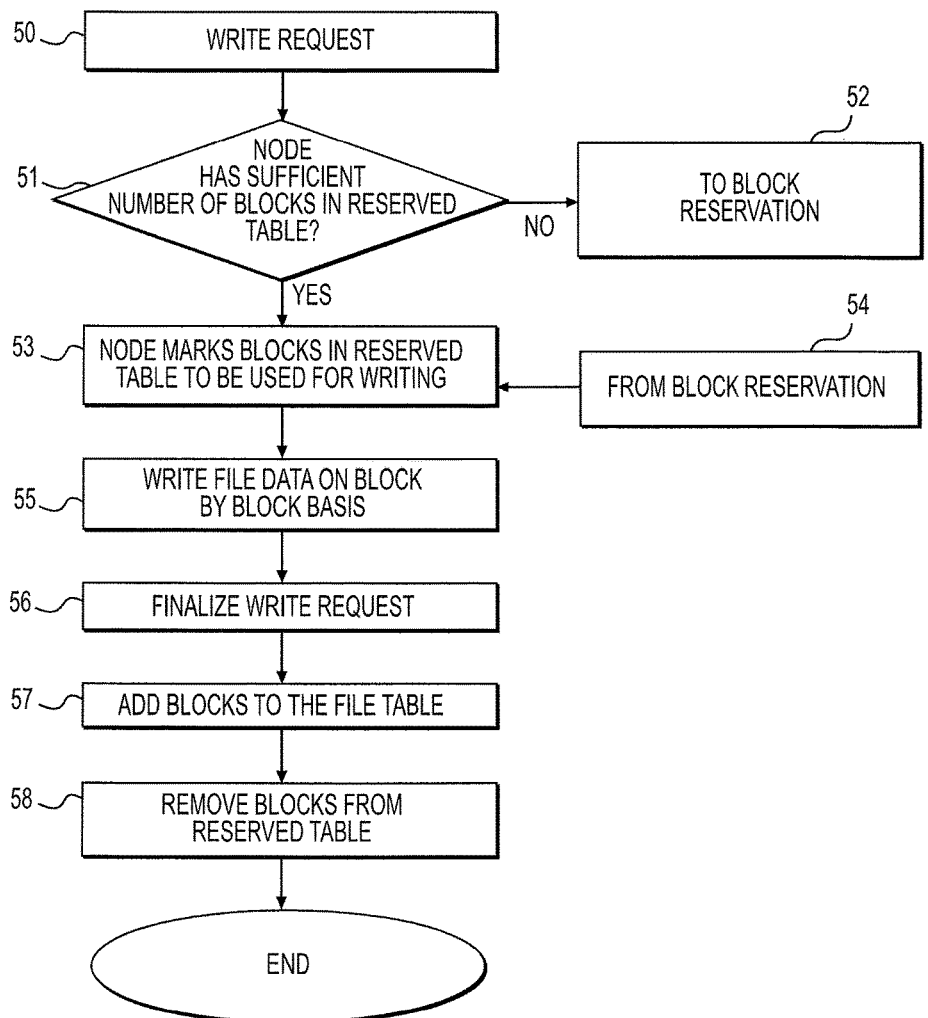
FIG. 5 is an exemplary write processing flow for a write request from a client in the environment shown in FIG. 1.

FIG. 5 is an exemplary write processing flow for a write request from a client in the environment shown in FIG. 1, for example. In FIG. 5, at step 50, one of the clients 14 sends a write request, regarding writing file data of a particular file, to one of the nodes 11, 12. At step 51, the filesystem metadata service 24G refers to the reserved table 42 in the relational database 24F to determine if a sufficient number of reserved blocks are available to store the file data of the file corresponding to the write request from the client 14. If a sufficient number of reserved blocks are not available, a request is made to the block storage service 24C for a sufficient number of blocks to be made available in the reserved table 42 at step 52 where processing moves to step 1408 of the block reservation processing flow shown in FIG. 14. In brief, allocated blocks are listed in the reserved table 42 and processing returns from step 54 to step 53, as shown in FIG. 5. Assuming a sufficient number of blocks are available in the reserved table 42 to store the file data, the writing to those blocks will proceed as described herein.

Next, at step 53, the node handling the write request will mark the blocks in the reserved table 42 which have been reserved by the node and are to be used to fulfill the write request. As the movement of allocated blocks from the free table 41 to the reserved table 42, and the marking of blocks to be used for writing is a change in the informational state of the relational database 24F on the respective node, the change should be reflected in the other respective node via data path 4E as well as the storage devices 18 or 19 so that the current states of the free table 41, reserved table 42, file table 43 and garbage table 44 are accessible to the other node via data path 4F in FIG. 3.

Any transactions, changes, or modifications to the relational database 24F stored on the respective node are synchronized with the relational database 24F of the other node as well as in the corresponding relational database information stored in the storage pool 16 on the storage devices 18 and 19. Accordingly, on each node and on the shared pool 16, changes to the one or more of the free table, reserved table, file table and garbage table are synchronized with the information stored in the system memory 24 of the node at which the changes originate. Alternatively, the filesystem metadata service 24G may synchronize the relational database information at periodic time intervals instead or use some other mechanism to trigger the synchronization.

After the necessary blocks have been marked for writing in the reserved table 42, the node handling the write request waits to begin receiving file data and then begins to write the file data on a block by block basis at step 55. If the node handling the write request crashes at this time, the client 14 will have to retry the write request with the other operational node 11,12 or wait for the crashed node to recover as described herein. If the node crashes at step 55, the writing of the file data will fail, the client will have to retry the write request, and crash recovery processing will be executed as described herein. Otherwise, at step 56 the write request will be finalized as all file data will have been stored in the storage pool 16 in the respectively marked blocks listed in the reserved table 42. At this time, the blocks storing the file data will be listed in the reserved table 42 and will need to be moved to the file table 43 to accurately reflect the state of the blocks storing the file data.

At step 57 in FIG. 5, the blocks storing the file data will be listed in the file table 43 along with the corresponding metadata of the file. Thereafter, at step 58, the marked blocks will be removed from the reserved table 42. As such, the blocks which are now listed in the file table 43 are held in association with the corresponding metadata of the file data stored therein. Accordingly, the blocks which store a file identified by pathname can be determined by the filesystem metadata service 24G. It is possible that a crash may occur in the node handling the write request during step 57 and that the blocks storing the file data may be listed in both the reserved table 42 and the file table 43. The crash recovery and garbage resolution processing, which are described below, in FIGS. 9A and 9B solve the foregoing problem which can occur when a crash occurs while one or more blocks are listed in both the reserved table 42 and the file table 43. Such a situation is also depicted in 4A of FIG. 12, for example.

Absent a crash occurring as described above, the write processing will end. During the write processing as shown in FIG. 5, the movement of blocks from the reserved table 42 to the file table 43 leads to changes in the informational state of the relational database 24F on the respective node. These changes should be reflected in the other respective node via data path 4E as well as the storage devices 18 or 19 so that the current states of the free table 41, reserved table 42, file table 43 and garbage table 44 are accessible to the other node via data path 4F in FIG. 3. Accordingly, on the other node and on the shared pool 16, the relational database information is synchronized with the information stored in the system memory 24 of the node handling the write request to reflect the changes to the file table 43 at least at the end of write request processing. After step 58, the write processing flow ends as shown in FIG. 5. Thus, all the file data provided by the client 14 will have been stored in the blocks of the storage pool 16 which were marked at step 53 and the file table 43 will list the respective blocks by block number with the corresponding metadata of the file.

In the processing flow shown in FIG. 5, the block reservation following step 51 is an atomic transaction in which the reservation of blocks from the free table 41 is either entirely successful or fails. Similarly, in step 1304, the allocation of blocks to the free table 41 is an atomic transaction in which the allocation of blocks necessary to meet the allocation watermark of the free table 41 is either successful or fails in its entirety. Further, in step 57, the listing of blocks storing the file data to the file table 43 is also an atomic transaction such that the file table 43 is guaranteed to include all blocks which store file data after finalizing the write request and the metadata for the given file in the storage pool. Still further, removal of the marked blocks at step 58 is also an atomic transaction which is either similarly successful or fails in its entirety.

Figure 6:
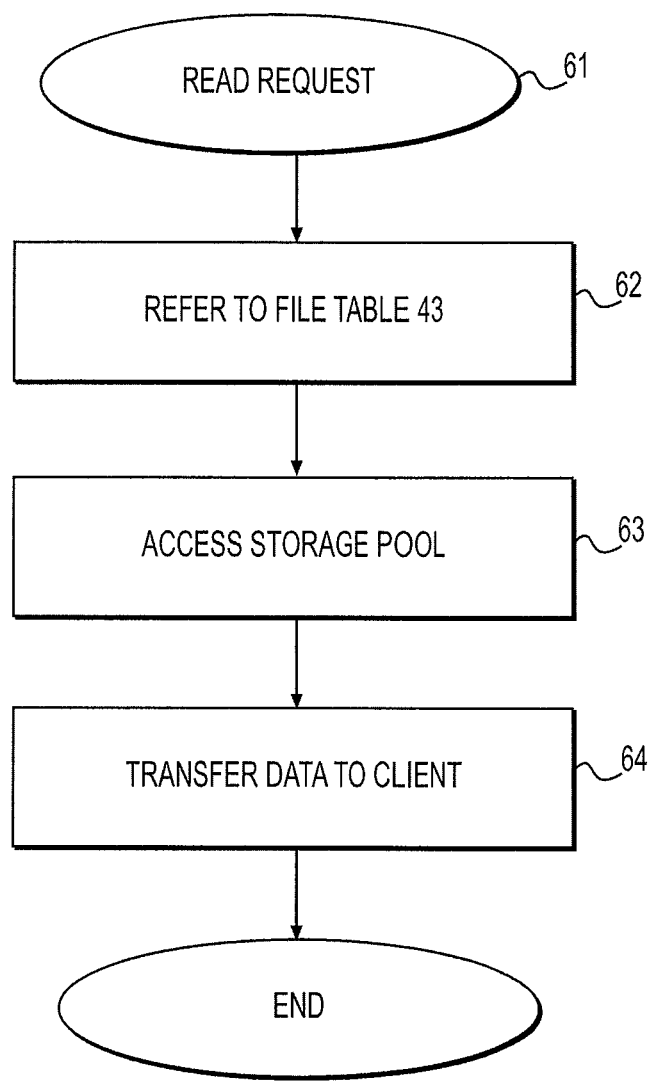
FIG. 6 is an exemplary read processing flow for a read request from a client in the environment shown in FIG. 1.

FIG. 6 is an exemplary read processing flow for a read request from a client in the environment shown in FIG. 1, for example. First, at step 61, one of the clients 61 sends a read request 61 to one of the nodes 11, 12 specifying file data stored in the storage pool 16. Next, as shown in FIG. 3, for example, the filesystem 24A will transfer the read request to the filesystem metadata service 24G which will refer to the relational database 24F, specifically the file table 43. By referring to the file table 43, the blocks storing the requested data are identified, and the storage pool is accessed at step 63 to retrieve the requested data. Accordingly, at step 64, the data is transferred to the relevant client 14 before the read processing ends.

Figure 7:
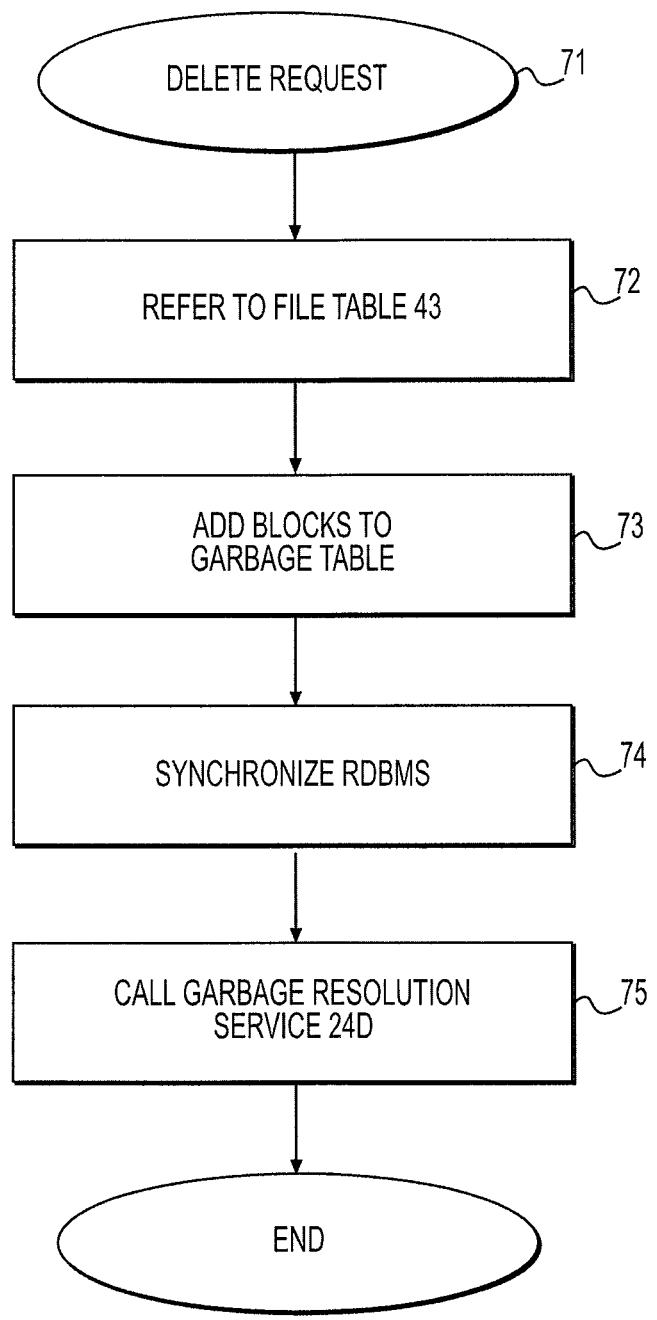
FIG. 7 is an exemplary delete processing flow for a delete request from a client in the environment shown in FIG. 1.

FIG. 7 is an exemplary delete processing flow for a delete request from a client in the environment shown in FIG. 1, for example.

Initially, at step 61, one of the clients 61 sends a delete request 71 to one of the nodes 11, 12 specifying file data stored in the storage pool 16. Next, as shown in FIG. 3, for example, the filesystem 24A will transfer the delete request to the filesystem metadata service 24G which will refer to the relational database 24F, specifically the file table 43. By referring to the file table 43, the blocks storing the requested data to be deleted are identified using the file metadata. At step 73, the blocks storing the requested data to be deleted are moved to the garbage table 44. Further, the changes made to the file table 43 and garbage table 44 in the relational database stored in the node handling the delete request at step 71 should be synchronized with the copies of the relational database 24F stored in the shared storage pool 16 at step 74 before the delete processing flow ends. Next, at step 75, the garbage resolution service 24D may be called to process the blocks listed in the garbage table 44. However, step 75 is not required to be performed every time a delete request is received. Instead, the file system metadata service 24G may be set to call the garbage resolution service 24D periodically or after the garbage table 44 has exceeded a predetermined size, for example.

Likewise, the deletion request 71 shown in FIG. 7 also is performed atomically by the nodes 11, 12. In other words, the specified data to be deleted will either occur in its entirety or the delete will fails in its entirety. The advantage provided by the atomic nature of the allocating, writing, reading and deleting operations, as well as copying and overwriting, is that each operation at the file-level is either guaranteed to be completed or will fail. Further, by reflecting the state of the blocks of the storage system in the relational database 24F, the relational database 24F becomes a highly efficient management tool for allowing each of the nodes to quickly recover from crashes by limiting the scope or amount of the filesystem 24 which must be validated upon restarting as will become apparent as follows.

As shown in FIG. 3, each node 11, 12 has an in-node copy of the relational database 24F which can be updated with the in-node copy of the relational database 24F of the other node via the data path 4E. Alternatively, each node 11, 12 may update the respective in-node copy of the relational database 24F by referring to the other node's relational database information stored in disks 18 or 19, respectively. However, it is preferable that the data path 4E be used primarily to avoid placing increased load on the data paths 4F. Namely, when one of the nodes 11, 12 has crashed, the other of the nodes remains operational and handles requests from the clients 14 for data stored in the storage pool. Upon recovery from crash, the recovered node will preferably use the synchronous replication data path 4E to get most up-to-date relational database information rather than attempt to synchronize directly with the relational database information on disks 18, 19 in the shared pool which will increase the data traffic on the data paths 4F.

Turning to FIG. 9A, a crash recovery processing flow for the recovery of one of the nodes from a crash is shown. First, one of the nodes 11, 12 will experience a crash at step 91A. After an arbitrary period of time has elapsed, at step 92A, the crashed node will recover (e.g., restart operation) and begin accepting client requests again. However, the state of the allocated blocks as listed in the reserved table 42 needs to be validated before the recovered node can begin to accept write requests in order to avoid overwriting file data due to errors in the blocks listed in the reserved table 42. Meanwhile, at step 93A, the non-crashed node will move all blocks in the reserved table 42 that are associated with the crashed node to the garbage table 44, and resumes availability to process requests from the client computer. While steps 92 and 93 are shown as parallel flows in FIG. 9, step 93A may occur before or after the recovery at step 92A of the crashed node. However, it is preferable that step 93A be performed by the non-crashed node as soon as the crash at the other node is detected, for example, using the heartbeat service 24H.

Following the recovery at step 92A, the recovered node will synchronize its in-node relational database information 24F by referring to the in-node relational database information 24F of the non-crashed node at step 94A. That is, assuming that Node #1 in FIG. 1 has crashed and recovered from the crash (failure), Node #1 will access the relational database 24F of Node #2 via the synchronous replication of data path 4E in FIG. 3 to synchronize its in-node relational database information 24F with non-crashed Node #2. Likewise, a similar procedure will occur if Node #2 were to crash and Node #1 were to remain operational. Alternatively, the recovered node will synchronize its in-node relational database information 24F by referring to the relational database information stored in the storage pool at step 94A.

Subsequently, at step 95A, the garbage resolution service 24D will be called to process the blocks listed in the garbage table 44 by the crashed node, yet the recovery processing flow does not need to wait for the garbage resolution service to complete before other processing may resume by the non-crashed node. However, the file system metadata service 24G may be alternatively set to call the garbage resolution service 24D periodically or after the garbage table 44 has exceeded a predetermined size. In addition, the relational database information stored by the nodes should be synchronized at step 95 so that each node has up-to-date block listings in the free table 41, reserved tabled 42, file table 43 and garbage table 44 via the data path 4E, or, in the alternative, by referring to the storage pool 16 via the data path 4F. As an additional modification, the crash recovery processing flow in FIG. 9A may be altered so that step 94A is performed prior to calling the garbage resolution service at step 95A.

Turning to FIG. 9B, a crash recovery processing flow for the recovery of both nodes from a crash is shown. For the case where crashes occur at both of the nodes, rendering the nodes unavailable to the clients 14, the crash processing flow is performed as in FIG. 9B as follows. In this case, both of the nodes will experience contemporaneous crashes 91 that render both nodes 11, 12 unable to process client requests. Accordingly, each of the nodes will have to separately recover before respectively becoming available to the clients.

Following the crash 91B of both nodes, one of the two nodes 11, 12 will recover first at step 92B. The first node to recover from crashing at step 92B will then move all the blocks listed in the reserved table 42 in its system memory (i.e., all blocks in association with Node #1 and all blocks listed in association with Node #2 in the reserved table 42) to the garbage table 44 at step 93B. After step 93B, the first node to recover will call the garbage resolution service 95B, but the recovery processing flow does not need to wait for the garbage resolution service to complete before other processing may resume by the nodes. Alternatively, as previously described above, the file system metadata service 24G may instead be set to call the garbage resolution service 24D periodically or after the garbage table 44 has exceeded a predetermined size.

Additionally, after recovery by the first node as step 92B, the second of the two nodes will recover at step 94B. Since, the first node to recover is tasked with moving the blocks listed in the reserved table 42 to the garbage table 44 at step 93B, it is unnecessary for the second recovered node to also move the blocks listed in the reserved table 42 of its in-node relational database 24F. Instead, once the second node has recovered, the second node will synchronize its in-node relational database information with the first recovered nodes at step 96B by accessing the relational database stored in the first recovered node so that the second recovered node has up-to-date block listings in the free table 41, reserved tabled 42, file table 43 and garbage table 44 via the data path 4E. In the alternative, the second recovered node can synchronize its in-node relational database information by referring to the storage pool 16 via the data path 4F to obtain the up-to-date relational database information of the first recovered node.

While in FIG. 9B, only the first node to recover moves all blocks to the garbage table at step 93B, for redundancy, the second node to recover may also move all blocks listed in its in-node reserved table 42 to the garbage table 44, as a modification to the processing flow in FIG. 9B. In another separate modification, at step 93B, the first node to recover will move all blocks in the reserved table 42 which have been reserved by itself to the garbage table. Likewise, after the second node has recovered at step 94B, the second node to recover will also move all blocks in the reserved table 42 which have been reserved by itself to the garbage table. Accordingly, both the first and second nodes will need to respectively synchronize their in-node relational databases with each other.

In FIGS. 9A and 9B, by placing blocks from the reserved table 42 in the garbage table 44 as soon as one of the two nodes recovers as in steps 93A and 93B, garbage resolution can be performed in a timely manner allowing the status of the blocks listed in the garbage table to be validated and returned to the free table 41 as needed.

In the foregoing descriptions of crash processing flows, it is preferable that in instances where only one of the nodes has crashed, the other, non-crashed node will perform steps 93 and 94 as shown in FIG. 9 while the crashed node recovers at step 92 in order to allow the crashed node to recover quickly and regain availability with respect to the clients 14. Further, it should be noted that the blocks in the reserved table 42 are moved to the garbage table 44 independent of the recovery of the crashed node so that the status of the blocks previously listed in the reserved table can quickly be validated to determine whether the blocks store proper file data. Further, in cases where both of the nodes have crashed, it is preferable that the first of the two nodes to recover will perform steps 93 and 94 independent of the second node's recovery from crashing. It is similarly advantageous that the blocks in the reserved table 42 are moved to the garbage table 44 independent of the recovery of the crashed node so that the status of the blocks previously listed in the reserved table can quickly be validated to determine whether the blocks store proper file data by the garbage resolution service 24D which will be described below in greater detail.

In the foregoing descriptions of crash recovery processing, it is assumed that each node is provided with an instance of the heartbeat service 24H which allows for each node to detect whether the other of the nodes has crashed. One of skill in the art will realize that any technique which allows for nodes which are operational to detect when the other of the nodes has crashed will be suitable for the heartbeat service 24H.

As shown at step 94 of FIG. 9, the garbage resolution service 24D is called. The garbage resolution service 24D can also be called at other times as explained herein. FIG. 10 shows the garbage resolution processing flow for determining the state of blocks listed in the garbage table 44 of the relational database of FIG. 4, for example. As described above, the garbage resolution service 24D may be called at steps 75 and 94, or alternatively, the garbage resolution service 24D may be scheduled to operate periodically or when the size of the garbage list 44 exceeds a predetermined size. For example, in FIG. 10, the garbage resolution service 24D is called at step 94. The garbage resolution service will process each block in the file table 44 and will refer to the file table 43 at step 95. It is preferable that each block is separately processed by the garbage resolution service 24D as individual atomic transactions. At step 96, it is determined whether the respective block is listed in both the file table 43 and the garbage table 44. If the respective block is not listed in both the file table 43 and the garbage table 44, that is the respective block is only listed in the garbage table 44, then the block is returned atomically to the free table 41 at step 97.

However, if the respective block is listed in both the file table 43 and the garbage table 44, then the block is removed atomically from the garbage table 44 at step 98. Namely, after a recovery as in step 92 of FIG. 9, all blocks in the reserved table 42 will be moved to the garbage table 44 at step 94. When a block is listed in both the file table 43 and the garbage table 44, such an occurrence in the relational database 24F is indicative that a crash has occurred after file data was written to blocks in the shared pool as the blocks are listed in the file table 43 but before the blocks were deleted from the reserved table 42. If a block is listed in both the file table 43 and the garbage table 44, the block should not be returned to the free table 41 because the block holds valid file data which should not be overwritten. Thus, the block is removed atomically at step 98 from the garbage table 44 to prevent the file data stored therein from being overwritten, while the block remains listed in the file table 43 to reflect that the block stores file data for a file listed in the associated metadata. Once all blocks listed in the garbage table 44 have been checked at step 99, the garbage resolution processing ends as the state of each block has been determined and each block has either been moved to the free table 41 to be reused or the validity of the block in the file table 43 has been confirmed.

Figure 11:
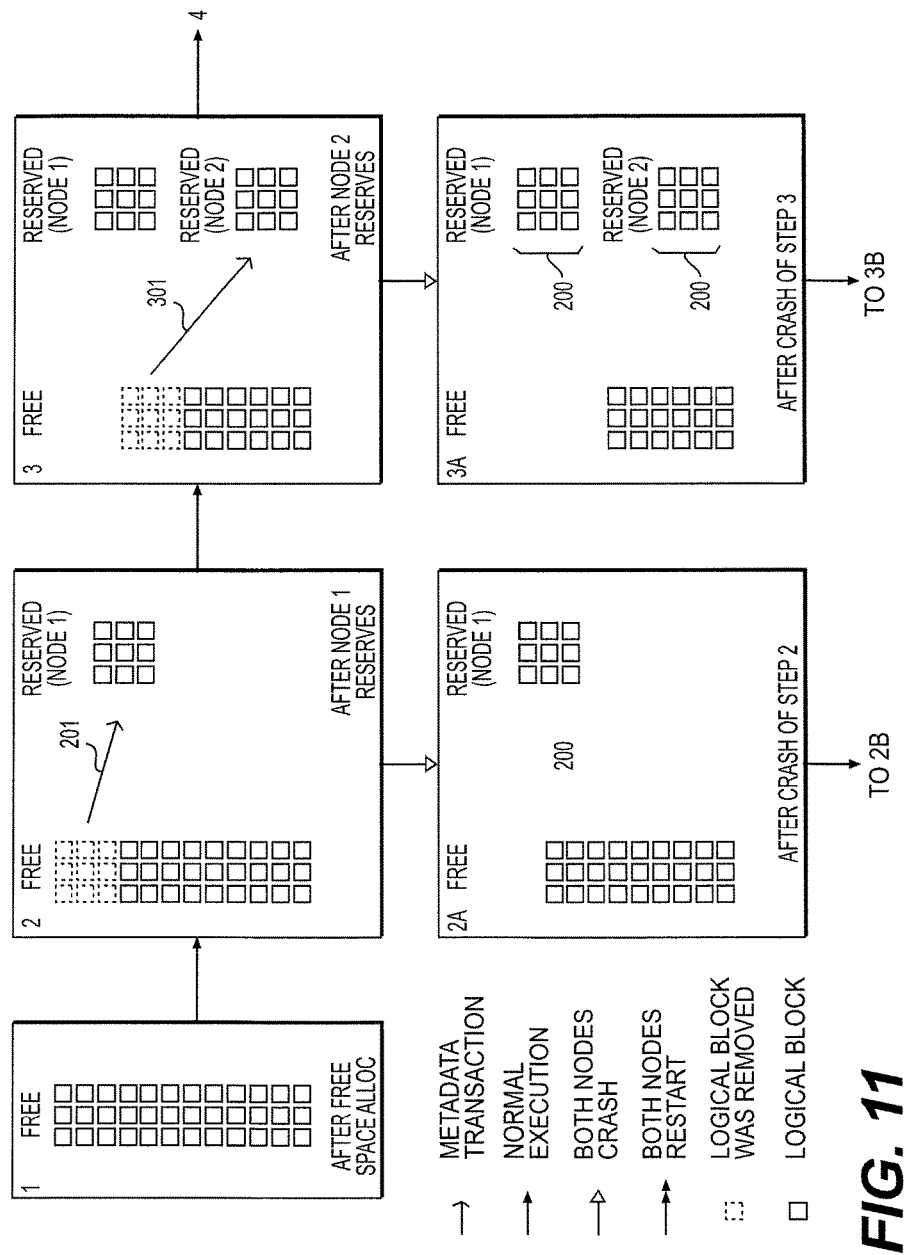
FIG. 11 is a state diagram flow chart showing the various logical states of blocks according to the processing flows shown in FIGS. 5 to 10.
Figure 11:
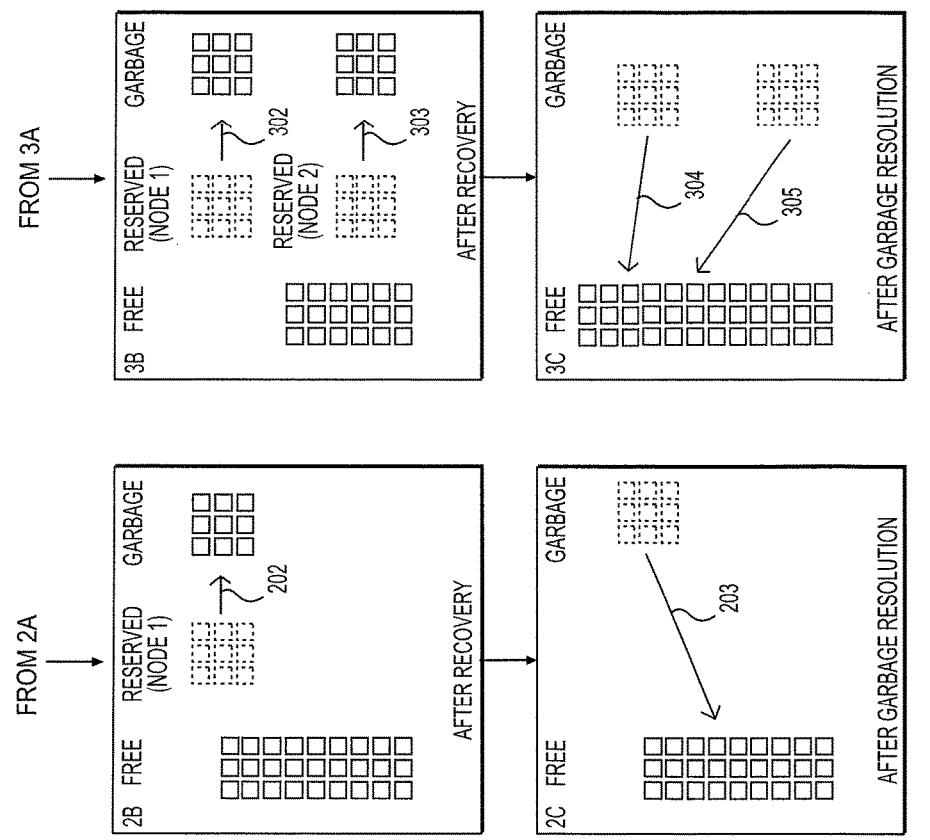
Figure 12:
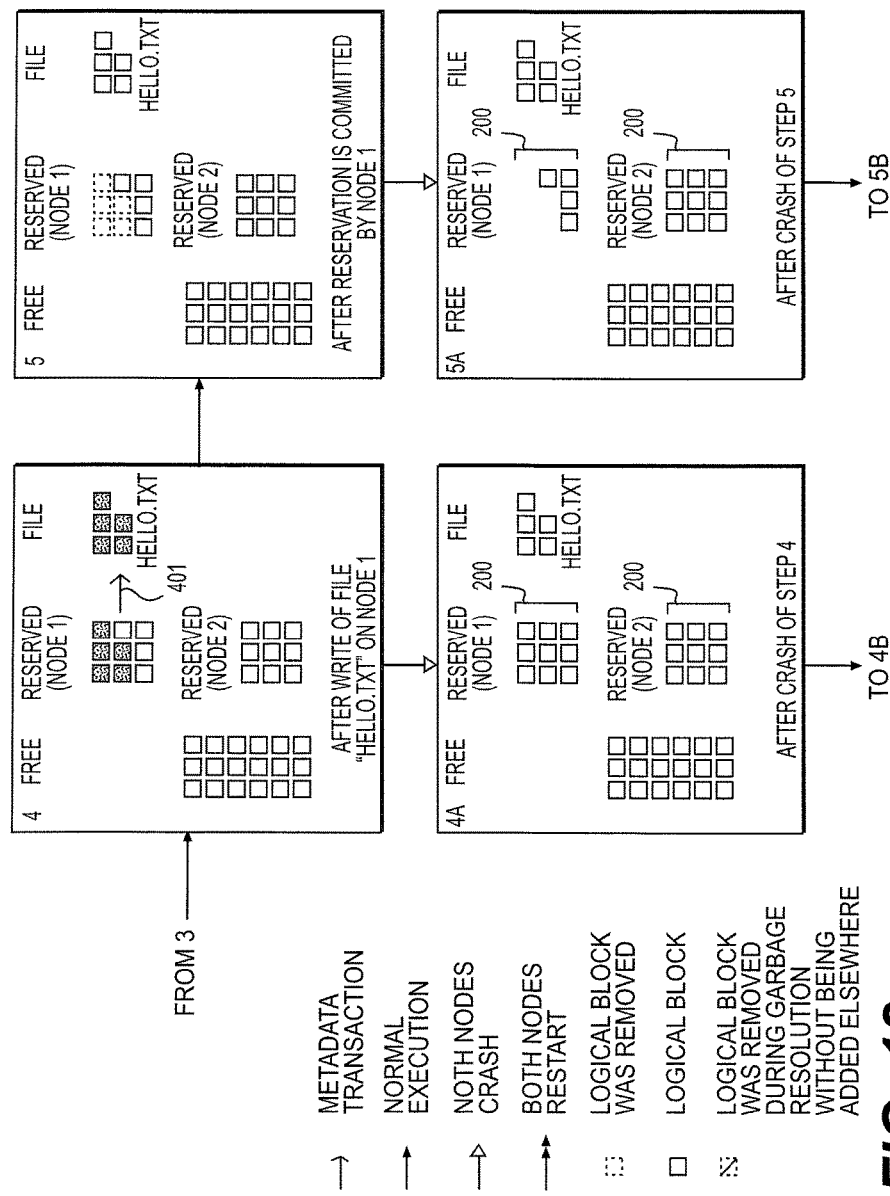
FIG. 12 is a continuation of the state diagram flow chart showing the various logical states of blocks from FIG. 11.
Figure 12:
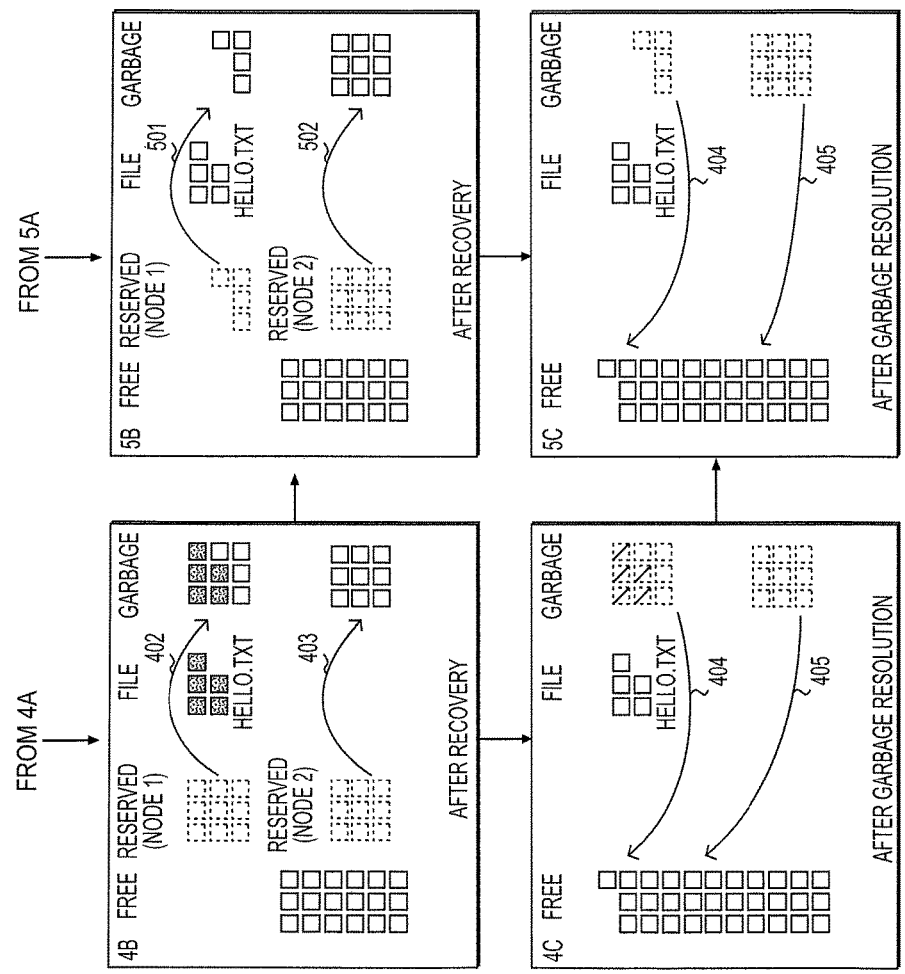

FIGS. 11 and 12 illustrate state diagrams of the relational database 24F with respect to writing file data and crash recovery and show the various logical states of blocks according to the processing flows shown in FIGS. 5 to 10. In the state 1 indicated by box 1 of FIG. 11, the free table 41 contains a listing of blocks in accordance with a free space allocation by the block storage service 24C. In accordance with normal execution of the system shown in FIG. 1, at state 2, a metadata transaction 201 will occur where one or more blocks are moved from the free table 41 to the reserved table 42 in accordance with a reservation by Node #1. Further, in the course of normal execution, at state 3, a metadata transaction 301 will occur where one or more blocks are moved from the free table 41 to the reserved table 42 in accordance with a reservation by Node #2. Normal execution will proceed to state 4, shown in FIG. 12, where Node #1 will write file data for a file (e.g., "hello.txt") into one or more blocks of the reserved table 42. In state 4, a metadata transaction 401 will occur which causes the blocks storing the file data to be listed in the file table 43. The state 4 will proceed to state 5 in the course of normal execution where the blocks which store the file data for the write request of the file ("hello.txt") will be removed from the reserved table 42.

However, during the progression from state 1 to state 5 in FIGS. 11 and 12, one or more of the nodes may crash causing the transition from state 2 to state 2a, from state 3 to state 3a, etc. When only one node crashes, the other node remains operational and may continue to service client requests by referring to the relational database information of both nodes which is available in the storage pool 16 on devices 18 and 19 as described above. In such instances, one of skill in the art will recognize that the remaining operational node will be able to continue to serve client requests so long as the one node remains operational while the other restarts operating in order to recover from the crash. However, the remaining operational node may be caused to crash as well which results in both nodes becoming non-operational and unable to handle client requests. In such instances, the normal execution shown in states 1 to 5 will transition to states 2a, 3a, 4a and 5a as will be described below and both nodes 11, 12 (e.g., Node #1 and Node #2) must restart after crashing.

In FIG. 11, one or more blocks will be reserved in the metadata transaction 201 in state 2, but if both nodes crash, then at state 2a, the reserved blocks will be presumed to be in an unknown state 200 in accordance with the present invention. Per the crash recovery shown in FIG. 9, for example, both nodes will then restart at state 2b, and the reserved table 43 containing blocks reserved by Node #1 will be moved to the garbage table 44 in the metadata transaction 202. Accordingly, the garbage resolution processing in FIG. 10 will transfer all the blocks from the garbage table 44 to the free table 41 in the metadata transaction 203 as shown in state 2c. As can be appreciated in FIG. 11, the free table 41 in state 2c resembles the free table 41 in state 1, and as both nodes have restarted after crashing, the normal execution of the system shown in FIG. 1 will resume.

Further in FIG. 11, after both Nodes #1 and #2 have reserved blocks as in state 3, if both nodes experience a crash, the reserved blocks will be presumed to be in an unknown state 200 as shown in state 3a. Per the crash recovery shown in FIG. 9, for example, both nodes will then restart at state 3b and the blocks listed in the reserved table 42 will be moved to the garbage table 44. Thereafter, at state 3c, the garbage resolution service 24D will move the blocks listed therein since no blocks are yet listed in the file table 43. That is, the metadata transactions 304, 305 will cause the blocks in the garbage table 44 to return to the free table 41, and normal processing will resume as shown in states 1 to 5.

In FIG. 12, in state 4, the file data of "hello.txt" has been written to the shared storage pool but the blocks storing the file data are listed in both the reserved table 41 and the file table 43. When both nodes crash, the blocks in the reserved table 41 will be presumed to be in an unknown state 200 as in state 4a. After recovering from the crash at state 4b, the blocks listed in the reserved table 41 will be moved to the garbage table 44 via metadata transactions 402, 403. However, as shown in FIG. 12, at state 4b, the blocks listed in the garbage table 44 include the blocks storing the file data of "hello.txt" and which are also listed in the file table 43. In accordance with the garbage resolution processing shown in FIG. 10, the blocks listed in both the garbage table 44 and the file table 43 will be removed from the garbage table 44 without being added to the free table 41. Meanwhile, in state 4c, the blocks not listed in both the garbage table 44 and the file table 43 will be moved to the free table 41. Normal processing will resume as in states 1 to 5, with the file table 43 listing the blocks storing the file data of "hello.txt" and the free table 41 adjusted accordingly.

In addition, FIG. 12 also shows a state 5a following a crash of both nodes from the state 5 where the blocks storing the file data of "hello.txt" have been removed from the reserved list 42. As shown in state 5a, the reserved table 42 includes blocks reserved by Node #1 less the blocks used to store "hello.txt" and blocks reserved by Node #2. The blocks in the reserved table 42 are presumed to be in an unknown state 200. After both nodes have recovered, the blocks in the reserved table 42 are moved in state 5b to the garbage table 44 via metadata transactions 501, 502 in accordance with the crash recovery processing flow shown in FIG. 9, for example. After calling the garbage resolution service 24D, the blocks listed in the garbage table 44 are returned to the free table 41 as in state 5c. Normal processing will resume as in states 1 to 5, with the file table 43 listing the blocks storing the file data of "hello.txt" and the free table 41 adjusted accordingly.

As shown in FIGS. 11 and 12, in each of the states 2c, 3c and 5c, all of the blocks listed in the garbage table 44 but not in the file table are returned to the free table 41. At step 96 of FIG. 10, it is determined whether each respective block of the garbage table 44 is also listed in the file table 43. If the respective block is not listed in both the file table 43 and the garbage table 44, that is the respective block is only listed in the garbage table 44, then the block is returned to the free table 41 at step 97. In state 4c, since the blocks of "hello.txt" are listed in the file table 43 and the garbage table 44, per the processing of FIG. 10 at step 98, these blocks are removed from the garbage table 44 but remain in the file table 43 as the blocks are indicated to store valid data in the shared pool.

As such, when recovering from crashes, the entire filesystem need not be validated which is time consuming and resource intensive. Rather, by providing the shared relational database 24F in a redundant manner in at least the storage pool 16, the amount of blocks which need to be checked for validity can be reduced as described above.

Of course, the system configurations illustrated in the Drawings are purely exemplary of systems in which the present invention may be implemented, and the invention is not limited to a particular hardware or logical configuration. It should be further understood by those skilled in the art that although the foregoing description has been made with respect to particular embodiments of the invention, the invention is not limited thereto and various changes and modifications may be made without departing from the spirit of the invention and the scope of the appended claims. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on computer-readable media. For example, the data structures of the invention can be stored on computer-readable media independently of one or more computer-readable media on which reside programs to carry out the processing flows described herein. The components of the system can be interconnected by any form or medium of digital data communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways.

From the foregoing, it will be apparent that the invention provides methods, apparatuses, systems and programs stored on computer readable media for improving the availability of stored data and providing efficient crash recovery. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
   a plurality of storage devices which have a plurality of storage blocks;
   a first node including a first processor managing a file system and a first memory being configured to store first information which manages states of the plurality of storage blocks; and
   a second node including a second processor managing the file system and a second memory being configured to store second information which manages the states of the plurality of storage blocks, the second information being synchronized with the first information,
   wherein, if a failure occurs on the second node, the first processor is configured to transition the state of one or more storage blocks, which are reserved by the second node to be used for storing data by the second node, to become one or more garbage blocks, and
   wherein, when the first processor or the second processor executes a transaction on the first information or the second information, respectively, the first processor or the second processor is configured to synchronize the transaction on the second information in the second node or on the first information in the first node, respectively.

2. The storage system according to claim 1, wherein, after the first processor transitions the state of the one or more storage blocks to become one or more garbage blocks, the first node is configured to start to process a request from a client computer against the file system.

3. The storage system according to claim 1, wherein, if the second node recovers from the failure, the second processor is configured to execute synchronization of the second information with the first information stored in the first memory by accessing the first information, and then to start to process a request from a client computer against the file system.

4. The storage system according to claim 1, wherein, when the first processor executes garbage collection on the one or more garbage blocks, if a write procedure of file data has been completed on a block in the one or more garbage blocks, the first processor is configured not to transition the state of the block from a garbage block to a free block, which is to be reserved by the first node or the second node.

5. The storage system according to claim 1, wherein, when the first processor executes garbage collection on the one or more garbage blocks, if a write procedure of file data has not been completed on a block in the one or more garbage blocks, the first processor is configured to transition the state of the block from a garbage block to a free block, which is to be reserved by the first node or the second node.

6. The storage system according to claim 1, wherein, when it is determined that a number of blocks which are reserved by the first node is insufficient, the first processor is configured to transition the state of one or more free blocks to reserved blocks to be used for storing data by the first node.

7. The storage system according to claim 1, wherein, a part of a storage area in the plurality of the storage devices is a shared storage pool accessible by the first node and the second node, and wherein the first information and the second information are also stored in the shared storage pool.

8. The storage system according to claim 1, wherein the first node and the second node provide the file system that stores file data in the storage blocks.

9. The storage system according to claim 1, wherein the first node and the second node store metadata of the file system.

10. A method of operating a storage system, comprising:
providing a plurality of storage blocks from a plurality of storage devices;
managing a file system by a first node and a second node of the storage system;
storing first information which manages states of the plurality of storage blocks for the first node of the storage system;
storing second information which manages states of the plurality of storage blocks for the second node of the storage system, the second information being synchronized with the first information;
executing a transaction on the first information or the second information by the first node or the second node respectively;
when the first node executes the transaction on the first information or when the second node executes the transaction on the second information, respectively, synchronizing the transaction on the second information in the second node or the first information in the first node, respectively; and
when a failure occurs on the second node, transitioning the state of one or more storage blocks by the first node which are reserved by the second node to be used for storing data by the second node to become one or more garbage blocks.

11. The method according to claim 10, further comprising:
after the first processor changes the state of the one or more storage blocks to become the one or more garbage blocks, starting to process a request from a client computer by the first node against the file system.

12. The method according to claim 10, further comprising:
when the second node recovers from the failure, executing synchronization of the second information with the first information stored in the first node by accessing the first information; and
starting to process a request from a client computer against the file system.

13. The method according to claim 10, further comprising:
executing garbage collection, by the first node, on the one or more garbage blocks; and
if a write procedure of file data has been completed on a block in the one or more garbage blocks, not changing the state of the block from a garbage block to a free block which is to be reserved by the first node or the second node.

14. The method according to claim 10, further comprising:
executing garbage collection, by the first node, on the one or more garbage blocks; and
if a write procedure of file data has not been completed on a block in the one or more garbage blocks, the first node is configured to change the state of the block from a garbage block to a free block, the free block which is to be reserved by the first node or the second node.

15. The method according to claim 10, further comprising:
when it is determined that a number of blocks which are reserved by the first node is insufficient, the first processor is configured to reserve one or more free blocks to be used for storing data by the first node.

16. The method according to claim 10, further comprising:
storing the first information and the second information in a shared storage pool; and
wherein a part of a storage area in the plurality of the storage devices is the shared storage pool and is accessible by the first node and the second node.

17. A method according to claim 10, wherein the first node and the second node provide the file system, which stores file data in the storage blocks.

18. A method according to claim 17, wherein the first node and the second node store metadata of the file system.

* * * * *